(12) United States Patent
Iino et al.

(10) Patent No.: US 8,612,062 B2
(45) Date of Patent: Dec. 17, 2013

(54) ENERGY MANAGEMENT SYSTEM AND ENERGY MANAGEMENT METHOD

(75) Inventors: Yutaka Iino, Kawasaki (JP); Yasuhiro Taguchi, Saitama (JP); Dai Murayama, Musashino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 338 days.

(21) Appl. No.: 12/876,478

(22) Filed: Sep. 7, 2010

(65) Prior Publication Data

US 2011/0060476 A1 Mar. 10, 2011

(30) Foreign Application Priority Data

Sep. 9, 2009 (JP) ................................. 2009-208269

(51) Int. Cl.
- *G05D 3/12* (2006.01)
- *G05D 9/00* (2006.01)
- *G06F 1/32* (2006.01)
- *H02J 3/38* (2006.01)

(52) U.S. Cl.
CPC ............... *G06F 1/3203* (2013.01); *H02J 3/382* (2013.01)
USPC .............. 700/297; 700/295; 700/291; 700/22

(58) Field of Classification Search
USPC .................... 700/295, 297, 291, 22
See application file for complete search history.

(56) References Cited

U.S. PATENT DOCUMENTS

| | | | |
|---|---|---|---|
| 6,882,904 B1 * | 4/2005 | Petrie et al. ................... | 700/295 |
| 7,130,719 B2 * | 10/2006 | Ehlers et al. ................... | 700/276 |
| 7,208,697 B2 * | 4/2007 | Blankenship et al. ... | 219/130.21 |
| 7,343,226 B2 * | 3/2008 | Ehlers et al. ................... | 700/276 |
| 7,379,997 B2 * | 5/2008 | Ehlers et al. ................... | 709/224 |
| 7,418,428 B2 * | 8/2008 | Ehlers et al. ..................... | 705/63 |
| 7,460,930 B1 * | 12/2008 | Howell et al. ................. | 700/295 |
| 7,516,106 B2 * | 4/2009 | Ehlers et al. ................... | 705/412 |
| 7,652,567 B2 * | 1/2010 | Murayama et al. ........... | 340/521 |

(Continued)

FOREIGN PATENT DOCUMENTS

| | | | | |
|---|---|---|---|---|
| EP | 1811354 A1 * | 7/2007 | .......... | G05B 19/409 |
| JP | 2000-112515 | 4/2000 | | |

(Continued)

OTHER PUBLICATIONS

Katiraei, Farid et al., "Microgrids Management: Controls and Operations Aspects of Microgrids," *IEEE Power & Energy Magazine*, pp. 54-65 (May/Jun. 2008).

(Continued)

*Primary Examiner* — Mohammad Ali
*Assistant Examiner* — Kelvin Booker
(74) *Attorney, Agent, or Firm* — Finnegan, Henderson, Farabow, Garrett & Dunner, LLP

(57) ABSTRACT

According to one embodiment, an energy management system includes an energy supply device and an energy demand device. The energy management system comprises a first device, a second device, storage sections, calculating sections. The first device is applied for the energy supply device. The second device is applied for the energy demand device. The storage sections are included in the first device and the second device, respectively, and store a condition as to comply with an adjustment request of energy supplied from the energy supply device to the energy demand device. The calculating sections are included in the first device and the second device, respectively, and cooperate to execute negotiation function calculating an energy adjustment amount satisfying the condition.

15 Claims, 24 Drawing Sheets

(56) References Cited

U.S. PATENT DOCUMENTS

| | | | |
|---|---|---|---|
| 7,949,615 B2* | 5/2011 | Ehlers et al. | 700/276 |
| 8,069,077 B2* | 11/2011 | Iino et al. | 705/7.31 |
| 8,078,330 B2* | 12/2011 | Brickfield et al. | 700/291 |
| 8,140,194 B2* | 3/2012 | Iino et al. | 700/295 |
| 8,183,995 B2* | 5/2012 | Wang et al. | 340/539.1 |
| 8,219,439 B2* | 7/2012 | Iino et al. | 705/7.31 |
| 8,255,187 B2* | 8/2012 | Ooba et al. | 702/188 |
| 2002/0198629 A1* | 12/2002 | Ellis | 700/286 |
| 2003/0023540 A2* | 1/2003 | Johnson et al. | 705/37 |
| 2004/0095237 A1* | 5/2004 | Chen et al. | 340/506 |
| 2004/0117330 A1* | 6/2004 | Ehlers et al. | 705/412 |
| 2004/0133314 A1* | 7/2004 | Ehlers et al. | 700/276 |
| 2004/0138981 A1* | 7/2004 | Ehlers et al. | 705/36 |
| 2004/0139038 A1* | 7/2004 | Ehlers et al. | 705/412 |
| 2005/0015283 A1* | 1/2005 | Iino et al. | 705/4 |
| 2005/0033707 A1* | 2/2005 | Ehlers et al. | 705/412 |
| 2005/0258154 A1* | 11/2005 | Blankenship et al. | 219/130.01 |
| 2007/0010916 A1* | 1/2007 | Rodgers et al. | 700/295 |
| 2007/0043477 A1* | 2/2007 | Ehlers et al. | 700/276 |
| 2007/0043478 A1* | 2/2007 | Ehlers et al. | 700/276 |
| 2007/0172018 A1* | 7/2007 | Murayama et al. | 376/245 |
| 2007/0255461 A1* | 11/2007 | Brickfield et al. | 700/291 |
| 2008/0167756 A1* | 7/2008 | Golden et al. | 700/297 |
| 2008/0272934 A1* | 11/2008 | Wang et al. | 340/870.11 |
| 2009/0157529 A1* | 6/2009 | Ehlers et al. | 705/26 |
| 2010/0030393 A1* | 2/2010 | Masters et al. | 700/295 |
| 2010/0191996 A1* | 7/2010 | Iino et al. | 713/323 |
| 2010/0217452 A1* | 8/2010 | McCord et al. | 700/295 |
| 2010/0217642 A1* | 8/2010 | Crubtree et al. | 705/8 |
| 2010/0218108 A1* | 8/2010 | Crabtree et al. | 715/738 |
| 2010/0222934 A1 | 9/2010 | Iino et al. | |
| 2010/0222935 A1* | 9/2010 | Forbes et al. | 700/291 |
| 2010/0235008 A1* | 9/2010 | Forbes et al. | 700/291 |
| 2010/0250590 A1* | 9/2010 | Galvin | 707/770 |
| 2011/0047052 A1* | 2/2011 | Cornish | 705/30 |
| 2011/0060476 A1* | 3/2011 | Iino et al. | 700/297 |
| 2011/0172841 A1* | 7/2011 | Forbes, Jr. | 700/292 |
| 2011/0270459 A1* | 11/2011 | Murai et al. | 700/295 |
| 2012/0221162 A1* | 8/2012 | Forbes, Jr. | 700/295 |
| 2012/0226384 A1* | 9/2012 | Forbes, Jr. | 700/291 |
| 2012/0239218 A1* | 9/2012 | Forbes, Jr. | 700/295 |
| 2012/0239219 A1* | 9/2012 | Forbes, Jr. | 700/296 |
| 2012/0271475 A1* | 10/2012 | Wang et al. | 700/295 |
| 2012/0271686 A1* | 10/2012 | Silverman | 705/14.1 |
| 2013/0038468 A1* | 2/2013 | Wang et al. | 340/870.02 |

FOREIGN PATENT DOCUMENTS

| | | |
|---|---|---|
| JP | 2002-10532 | 1/2002 |
| JP | 2002-176729 | 6/2002 |
| JP | 2002-230097 | 8/2002 |
| JP | 2002-245126 | 8/2002 |
| JP | 2002-271981 | 9/2002 |
| JP | 2003-296409 | 10/2003 |
| JP | 2005-33952 | 2/2005 |
| JP | 2008-512757 | 4/2008 |
| JP | 2009-124885 | 6/2009 |
| WO | WO 2010097891 A1 * | 9/2010 |

OTHER PUBLICATIONS

European Search Report and European Search Opinion issued in European Application No. 10175052.9, dated Jul. 2, 2012 (7 pages).
Notice of Reasons for Rejection issued by the Japanese Patent Office on Apr. 12, 2011, for Japanese Patent Application No. 2009-208269, and English-language translation thereof.

* cited by examiner

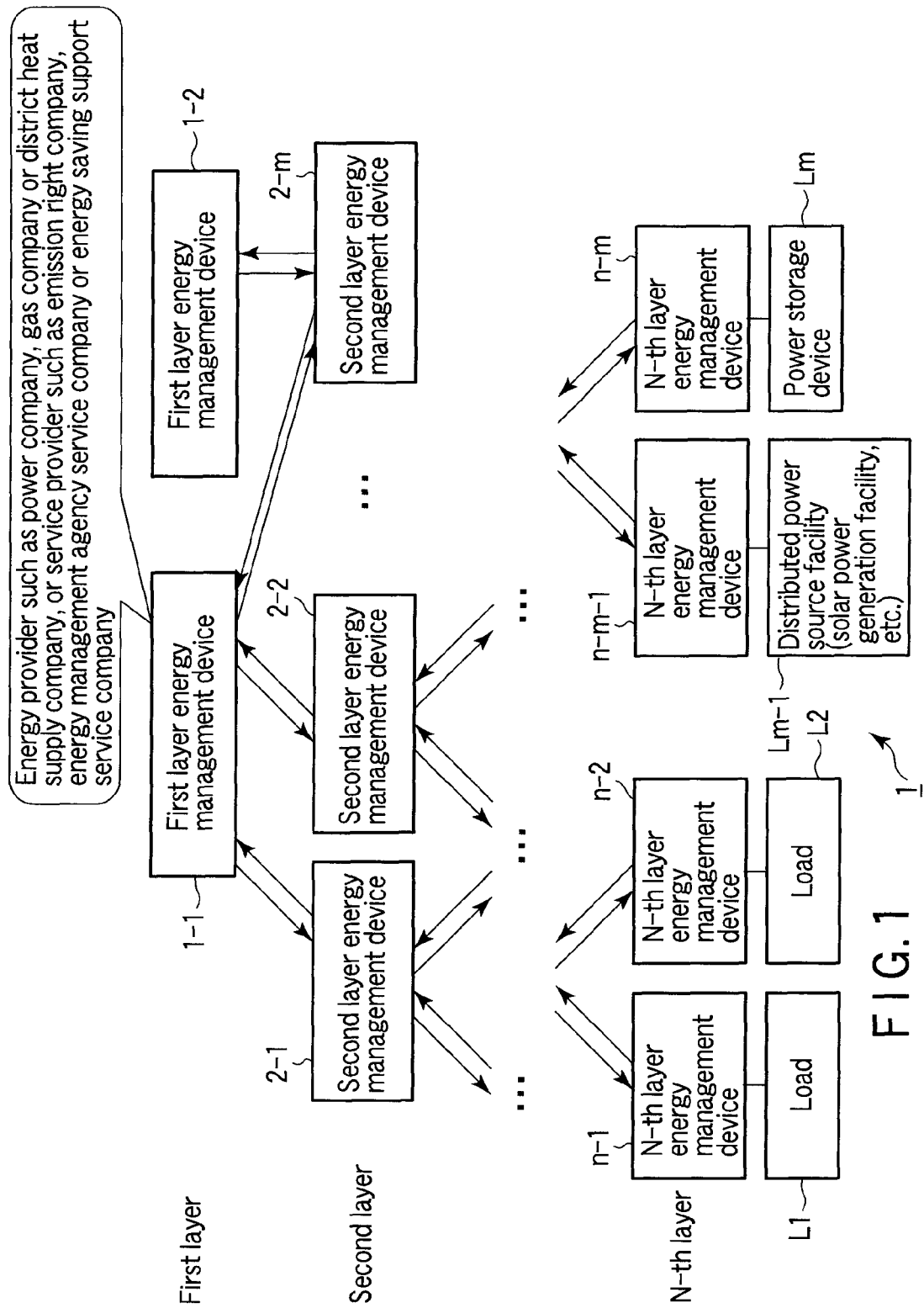
F I G. 1

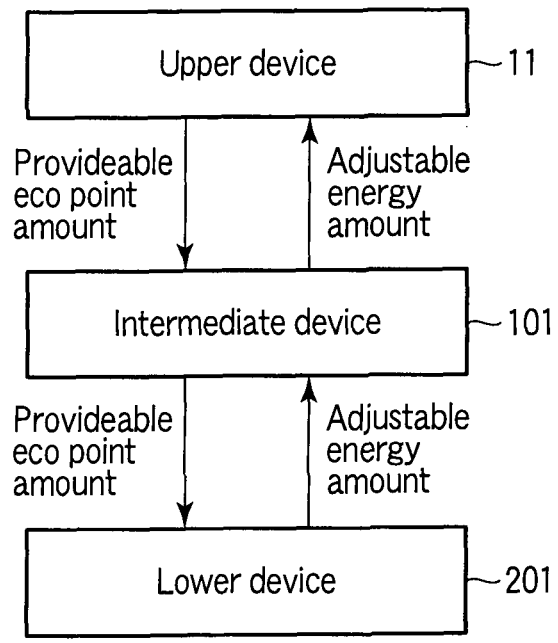
F I G. 3
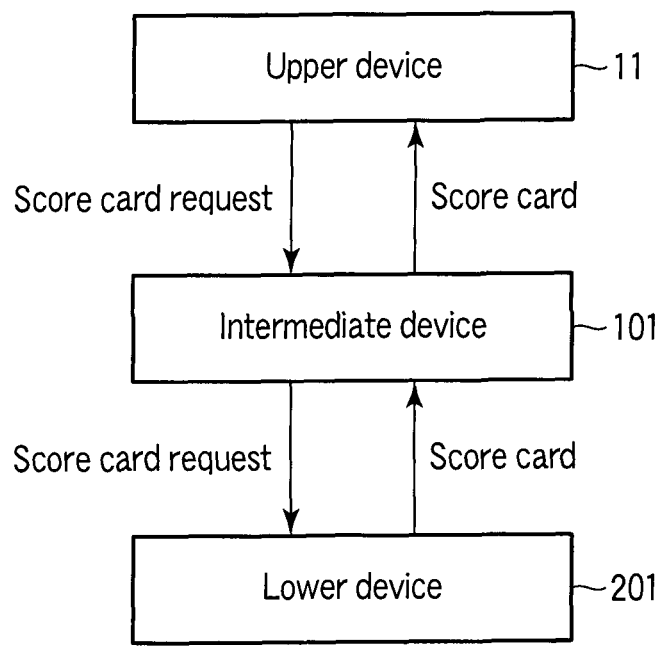
F I G. 4

Case of score card

Score card

| Target facility type : | Air conditioner | | | | | | | | | | | | | | | | | | | | | | |
|---|---|---|---|---|---|---|---|---|---|---|---|---|---|---|---|---|---|---|---|---|---|---|---|
| Facility No. | 1 | | | | | | | | | | | | | | | | | | | | | | |
| Time | 1H | 2H | 3H | 4H | 5H | 6H | 7H | 8H | 9H | 10H | 11H | 12H | 13H | 14H | 15H | 16H | 17H | 18H | 19H | 20H | 21H | 22H |
| Predicted energy demand [kWh] | 0 | 0 | 0 | 0 | 0 | 0 | 0 | 1 | 1 | 1.5 | 1.7 | 1.8 | 2 | 2 | 2 | 1.8 | 1.5 | 1.1 | 1 | 1 | 0.5 | 0.5 |
| Demand error | ±0% | ±0% | ±0% | ±0% | ±0% | ±0% | ±0% | ±10% | ±10% | ±15% | ±15% | ±20% | ±20% | ±20% | ±20% | ±20% | ±10% | ±10% | ±10% | ±10% | ±10% | ±10% |
| Adjustable energy range | +0%<br>-0% | +0%<br>-0% | +0%<br>-0% | +0%<br>-0% | +0%<br>-0% | +0%<br>-0% | +0%<br>-0% | +10%<br>-20% | +10%<br>-20% | +10%<br>-20% | +10%<br>-20% | +10%<br>-20% | +0%<br>-10% | +0%<br>-10% | +0%<br>-10% | +10%<br>-20% | +10%<br>-20% | +10%<br>-20% | +10%<br>-20% | +10%<br>-20% | +10%<br>-20% | +10%<br>-20% |
| Reward eco point | 0 | 0 | 0 | 0 | 0 | 0 | 0 | 10 | 10 | 10 | 15 | 15 | 20 | 20 | 20 | 15 | 15 | 10 | 10 | 10 | 5 | 5 |
| Shiftable energy time | — | — | — | — | — | — | — | — | — | — | — | — | — | — | — | — | — | — | — | — | — | — |
| Reward eco point | — | — | — | — | — | — | — | — | — | — | — | — | — | — | — | — | — | — | — | — | — | — |
| Extendable/shortenable operation time range | +10%<br>-20% | | | | | | | | | | | | | | | | | | | | | |
| Reward eco point | 5 | 10 | | | | | | | | | | | | | | | | | | | | |
| Accumulated kWh increasable/decreasable range | +10%<br>-20% | | | | | | | | | | | | | | | | | | | | | |
| Reward eco point | 5 | 10 | | | | | | | | | | | | | | | | | | | | |
| Possibility of forced load blocking | — | — | — | — | — | — | — | P | P | P | P | P | P | P | P | P | P | P | P | P | P | P |
| Reward eco point | 0 | 0 | 0 | 0 | 0 | 0 | 0 | 50 | 50 | 50 | 75 | 75 | 100 | 100 | 100 | 75 | 75 | 50 | 50 | 50 | 25 | 25 |

H: Hour   P: Possible

F I G. 6

Case of washing machine

| Score card | | 1H | 2H | 3H | 4H | 5H | 6H | 7H | 8H | 9H | 10H | 11H | 12H | 13H | 14H | 15H | 16H | 17H | 18H | 19H | 20H | 21H | 22H |
|---|---|---|---|---|---|---|---|---|---|---|---|---|---|---|---|---|---|---|---|---|---|---|---|
| Target facility type : | Washing machine | | | | | | | | | | | | | | | | | | | | | | |
| Facility No. | 2 | | | | | | | | | | | | | | | | | | | | | | |
| Time | | 1H | 2H | 3H | 4H | 5H | 6H | 7H | 8H | 9H | 10H | 11H | 12H | 13H | 14H | 15H | 16H | 17H | 18H | 19H | 20H | 21H | 22H |
| Predicted energy demand [kWh] | | 0 | 0 | 0 | 0 | 0 | 0 | 0 | 1 | 1 | 1.5 | 1.7 | 1.8 | 2.0 | 2.0 | 2.0 | 1.8 | 1.5 | 1.1 | 1 | 1 | 0.5 | 0.5 |
| Demand error | | ±0% | ±0% | ±0% | ±0% | ±0% | ±0% | ±0% | ±10% | ±10% | ±15% | ±15% | ±20% | ±20% | ±20% | ±20% | ±20% | ±20% | ±10% | ±10% | ±10% | ±10% | ±10% |
| Adjustable energy range | | – | – | – | – | – | – | – | – | – | – | – | – | – | – | – | – | – | – | – | – | – | – |
| Reward eco point | | – | – | – | – | – | – | – | – | – | – | – | – | – | – | – | – | – | – | – | – | – | – |
| Shiftable energy time | | P | P | P | P | P | P | P | – | – | P | P | P | P | P | P | P | P | P | P | P | P | P |
| Reward eco point | | 10 | 10 | 10 | 10 | 10 | 10 | 10 | – | – | 5 | 5 | 5 | 5 | 5 | 5 | 5 | 5 | 5 | 5 | 5 | 5 | 5 |
| Extendable/shortenable operation time range | +10%–20% | | | | | | | | | | | | | | | | | | | | | | |
| Reward eco point | 5 | 10 | | | | | | | | | | | | | | | | | | | | | | |
| Accumulated kWh increasable/decreasable range | +10%–20% | | | | | | | | | | | | | | | | | | | | | | |
| Reward eco point | 5 | 10 | | | | | | | | | | | | | | | | | | | | | | |
| Possibility of forced load blocking | | – | – | – | – | – | – | – | P | P | P | P | P | P | P | P | P | P | P | P | P | P | P |
| Reward eco point | | 0 | 0 | 0 | 0 | 0 | 0 | 0 | 50 | 50 | 50 | 75 | 75 | 100 | 100 | 100 | 75 | 75 | 50 | 50 | 50 | 25 | 25 |

H: Hour    P: Possible

FIG. 7

Case of solar power generation facility

| Score card | | | | | | | | | | | | | | | | | | | | | | |
|---|---|---|---|---|---|---|---|---|---|---|---|---|---|---|---|---|---|---|---|---|---|---|
| Target facility type : | Sunlight power generation | | | | | | | | | | | | | | | | | | | | | |
| Facility No. | 3 | | | | | | | | | | | | | | | | | | | | | |
| Time | 1H | 2H | 3H | 4H | 5H | 6H | 7H | 8H | 9H | 10H | 11H | 12H | 13H | 14H | 15H | 16H | 17H | 18H | 19H | 20H | 21H |
| Predicted energy demand [kWh] | 0 | 0 | 0 | 0 | 0 | 0.1 | 0.3 | 0.6 | 0.8 | 1 | 1.2 | 1.5 | 1.2 | 1 | 0.8 | 0.6 | 0.3 | 0.1 | 0 | 0 | 0 |
| Demand error | ±0% | ±0% | ±0% | ±0% | ±0% | -100% | -100% | -100% | -100% | -100% | -100% | -100% | -100% | -100% | -100% | -100% | -100% | -100% | | | |
| Adjustable energy range | — | — | — | — | — | — | — | — | — | — | — | — | — | — | — | — | — | — | — | — | — |
| Reward eco point | 0 | 0 | 0 | 0 | 0 | 0 | 0 | 0 | 0 | 0 | 0 | 0 | 0 | 0 | 0 | 0 | 0 | 0 | | | |
| Shiftable energy time | — | — | — | — | — | — | — | — | — | — | — | — | — | — | — | — | — | — | — | — | — |
| Reward eco point | — | — | — | — | — | — | — | — | — | — | — | — | — | — | — | — | — | — | — | — | — |
| Extendable/shortenable operation time range | +0% | -0% | | | | | | | | | | | | | | | | | | | |
| Reward eco point | — | — | | | | | | | | | | | | | | | | | | | |
| Accumulated kWh increasable/decreasable range | +0% | -0% | | | | | | | | | | | | | | | | | | | |
| Reward eco point | — | — | | | | | | | | | | | | | | | | | | | |
| Possibility of forced load blocking | — | — | — | — | — | P | P | P | P | P | P | P | P | P | P | P | P | P | — | — | — |
| Reward eco point | 0 | 0 | 0 | 0 | 0 | 1 | 2 | 3 | 4 | 6 | 8 | 10 | 8 | 6 | 4 | 3 | 2 | 1 | 0 | 0 | 0 |

H: Hour    P: Possible

FIG. 8

Case of TV

| Score card | | | | | | | | | | | | | | | | | | | | | | | | |
|---|---|---|---|---|---|---|---|---|---|---|---|---|---|---|---|---|---|---|---|---|---|---|---|---|
| Target facility type : | TV | | | | | | | | | | | | | | | | | | | | | | | |
| Facility No. | 4 | | | | | | | | | | | | | | | | | | | | | | | |
| Time | 1H | 2H | 3H | 4H | 5H | 6H | 7H | 8H | 9H | 10H | 11H | 12H | 13H | 14H | 15H | 16H | 17H | 18H | 19H | 20H | 21H | 22H | 23H | |
| Predicted energy demand [kWh] | 0 | 0 | 0 | 0 | 0 | 0 | 0 | 1 | 1 | 0 | 0 | 0 | 1 | 0 | 0 | 0 | 0 | 1 | 1 | 1 | 1 | 0 | 0 | 0 |
| Demand error | ±0% | −5% | −10% | −20% | −30% | −40% | −50% | ±0% | ±0% | ±0% | ±0% | ±0% | ±0% | ±0% | ±0% | ±0% | ±0% | ±0% | ±0% | ±0% | ±0% | ±0% | ±0% | ±0% |
| Adjustable daily operation time range | | | | | | | | | | | | | | | | | | | | | | | | |
| Reward eco point | 0 | 5 | 10 | 15 | 20 | 25 | 30 | | | | | | | | | | | | | | | | | |

H: Hour

F I G. 9

Case of outdoor light

| Score card | | | | | | | | | | | | | | | | | | | | | | | | |
|---|---|---|---|---|---|---|---|---|---|---|---|---|---|---|---|---|---|---|---|---|---|---|---|---|
| Target facility type : | Outdoor light | | | | | | | | | | | | | | | | | | | | | | | |
| Facility No. | 5 | | | | | | | | | | | | | | | | | | | | | | | |
| Time | 1H | 2H | 3H | 4H | 5H | 6H | 7H | 8H | 9H | 10H | 11H | 12H | 13H | 14H | 15H | 16H | 17H | 18H | 19H | 20H | 21H | 22H | 23H |
| Predicted energy demand [kWh] | 1 | 1 | 1 | 1 | 1 | 1 | 0 | 0 | 0 | 0 | 0 | 0 | 0 | 0 | 0 | 0 | 0 | 1 | 1 | 1 | 1 | 1 | 1 |
| Demand error | ±0% | ±0% | ±0% | ±0% | ±0% | ±0% | ±0% | ±0% | ±0% | ±0% | ±0% | ±0% | ±0% | ±0% | ±0% | ±0% | ±0% | ±0% | ±0% | ±0% | ±0% | ±0% | ±0% |
| Possibility of load blocking | P | P | P | P | P | P | – | – | – | – | – | – | – | – | – | – | – | P | P | P | P | P | P |
| Reward eco point | 5 | 5 | 5 | 3 | 3 | 2 | – | – | – | – | – | – | – | – | – | – | – | 2 | 3 | 5 | 5 | 5 | 5 |

H: Hour　　P: Possible

F I G. 10

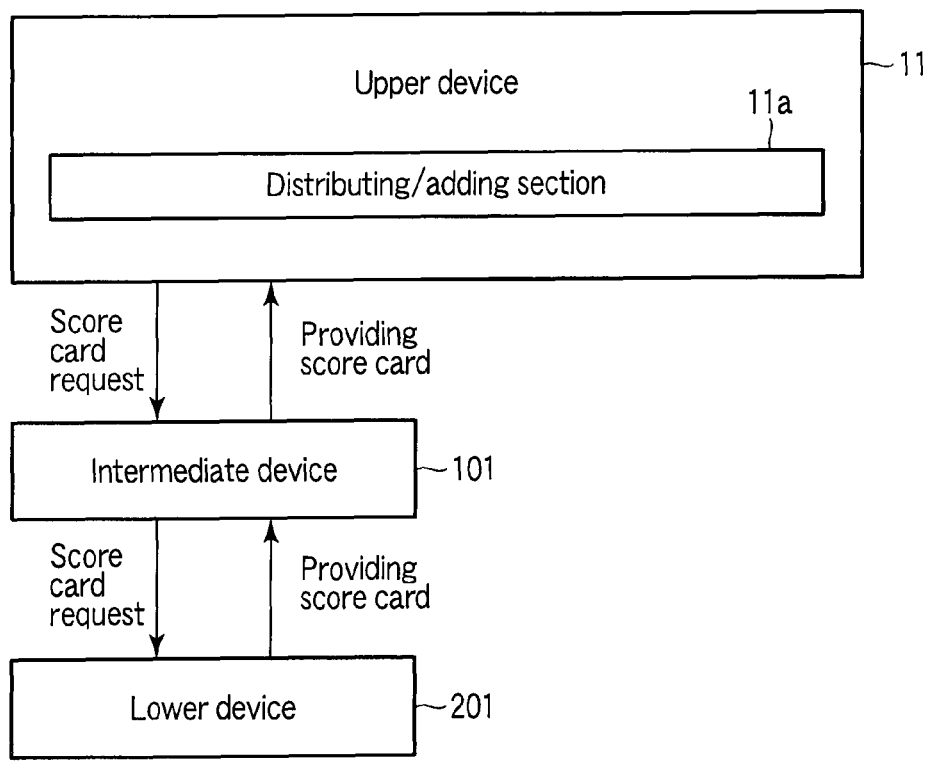
F I G. 11
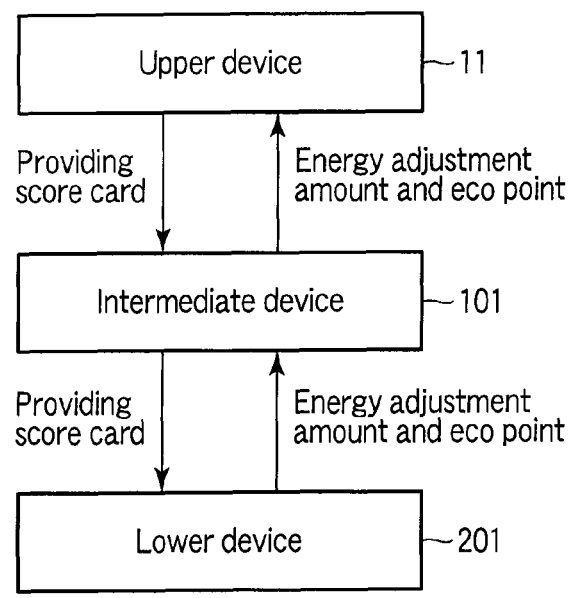
F I G. 12

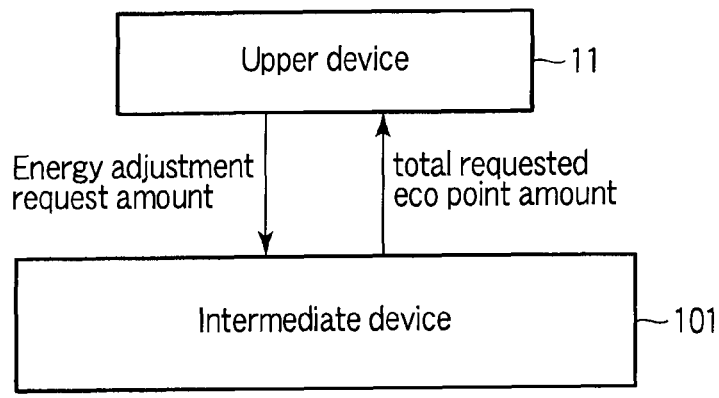
Calculate adjustment amount distribution to lower device so as to satisfy energy adjustment request amount and minimize corresponding total requested eco point amount
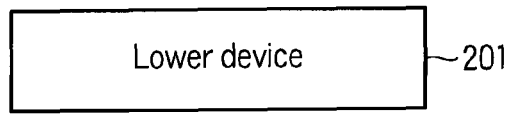
F I G. 13
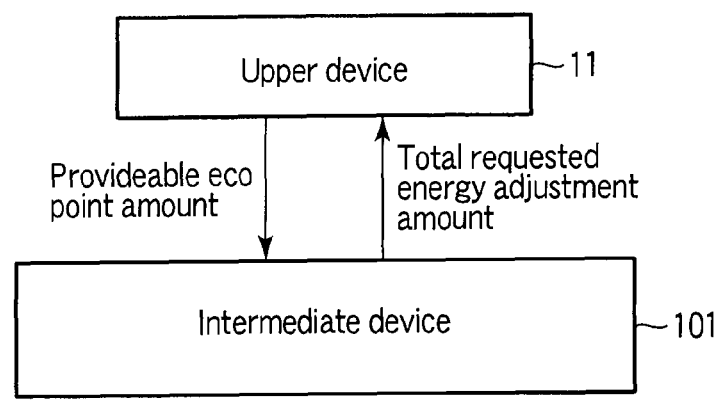
Calculate eco point distribution to lower device so as to maximize corresponding total energy adjustment amount in range of provideable eco point amount
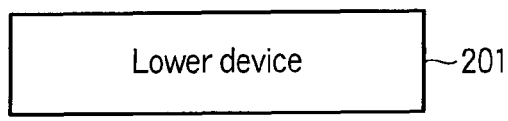
F I G. 14

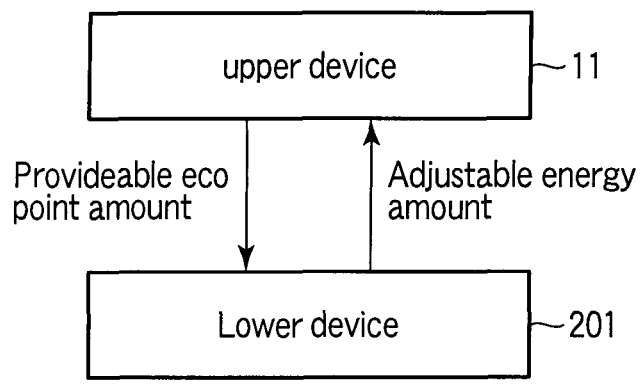
F I G. 18
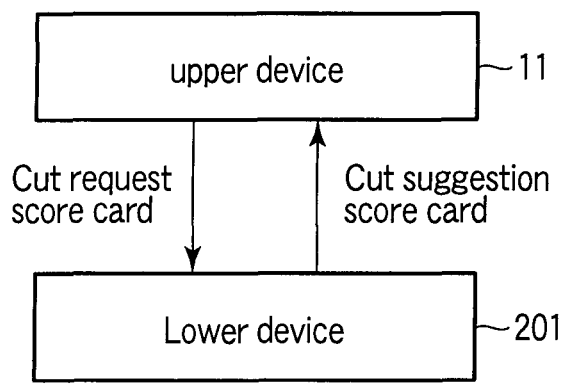
F I G. 19

Cut request score card

| Cut request score card | | | | |
|---|---|---|---|---|
| Target facility type : | | Upper EMS | | |
| Facility No. | | 1 | | |
| Time | | 1Hour | 2Hour | 3Hour |
| Predicted energy demand [kWh] | | 10 | 20 | 5 |
| Demand error | | ±0% | ±0% | ±0% |
| | | Adjustable energy range | | |
| Reward eco point | 0 | 0% | 0% | 0% |
| | 1 | -10% | -10% | -20% |
| | 2 | -20% | -20% | -40% |
| | 3 | -30% | -30% | -60% |
| | 4 | -40% | -40% | -80% |
| | 5 | -50% | -50% | -100% |
| | 6 | -60% | — | — |
| | 7 | -70% | — | — |
| | 8 | -80% | — | — |

F I G. 20

Cut suggestion score card

| Cut suggestion score card | | | | |
|---|---|---|---|---|
| Target facility type : | | Upper EMS | | |
| Facility No. | | 1 | | |
| Time | | 1Hour | 2Hour | 3Hour |
| Predicted energy demand [kWh] | | 10 | 20 | 5 |
| Demand error | | ±0% | ±0% | ±0% |
| | | Adjustable energy range | | |
| Reward eco point | 0 | 0% | 0% | 0% |
| | 1 | -20% | -10% | -30% |
| | 2 | -30% | -15% | -50% |
| | 3 | -40% | -20% | -60% |
| | 4 | -45% | — | -70% |
| | 5 | -50% | — | -80% |
| | 6 | -55% | — | — |
| | 7 | -58% | — | — |
| | 8 | -60% | — | — |

F I G. 21

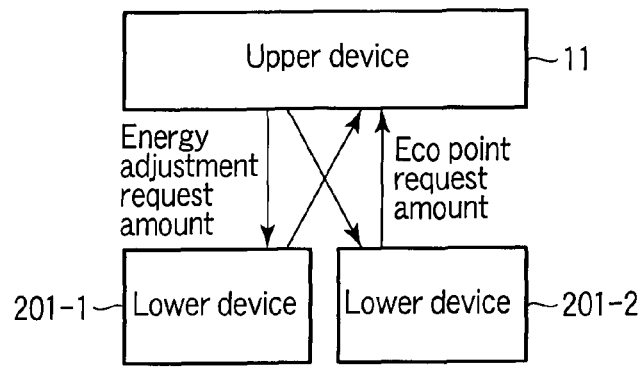
F I G. 24
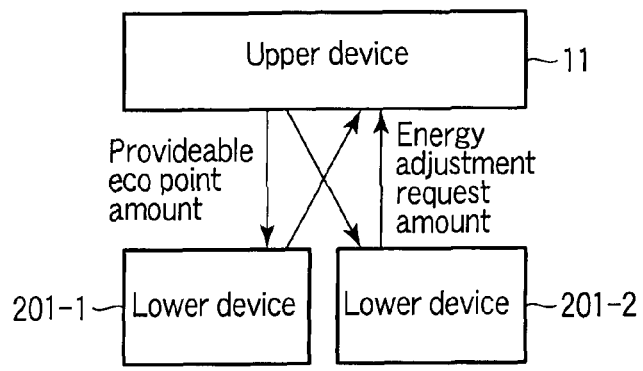
F I G. 25
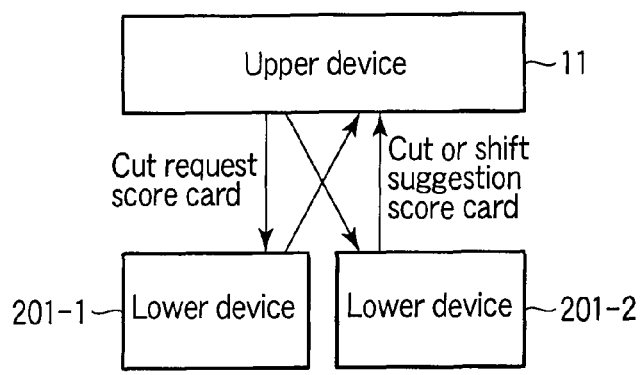
F I G. 26

Cut request score card

| Cut request score card | | |
|---|---|---|
| Target facility type : | | Upper EMS |
| Facility No. | | 1 |
| Time | | 1 Hour |
| Predicted energy demand [kWh] | | 20 |
| Demand error | | ±0% |
| | | Adjustable energy range |
| Reward eco point | 0 | 0% |
| | 2 | -5% |
| | 4 | -10% |
| | 6 | -15% |
| | 8 | -20% |
| | 10 | -25% |
| | 12 | -30% |
| | 14 | -35% |
| | 16 | -40% |

F I G. 27

Cut request score card

| Cut request score card | | |
|---|---|---|
| Target facility type : | | Lower EMS |
| Facility No. | | 1 |
| Time | | 1 Hour |
| Predicted energy demand [kWh] | | 10 |
| Demand error | | ±0% |
| | | Adjustable energy range |
| Reward eco point | 0 | 0% |
| | 1 | -5% |
| | 2 | -10% |
| | 3 | -15% |
| | 4 | -20% |
| | 5 | -25% |
| | 6 | -28% |
| | 7 | -30% |
| | 8 | — |

F I G. 28

Shift suggestion score card

| Shift suggestion score card | | | |
|---|---|---|---|
| Target facility type : | | Lower EMS | |
| Facility No. | | 2 | |
| Time | | 1Hour | 2Hour |
| Predicted energy demand [kWh] | | 10 | 10 |
| Demand error | | ±0% | ±0% |
| | | Adjustable energy range | |
| Reward eco point | 0 | 0% | 0% |
| | 1 | -15% | 15% |
| | 2 | -20% | 20% |
| | 3 | -23% | 23% |
| | 4 | -24% | 24% |
| | 5 | -25% | -25% |
| | 6 | — | |
| | 7 | — | |
| | 8 | — | |

F I G. 29

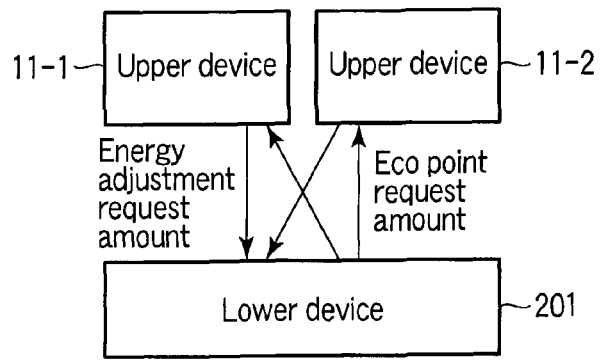
F I G. 31
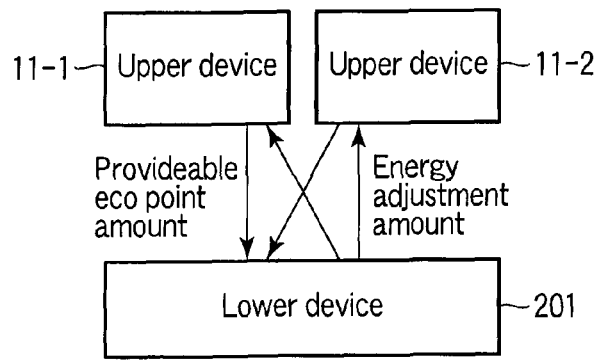
F I G. 32
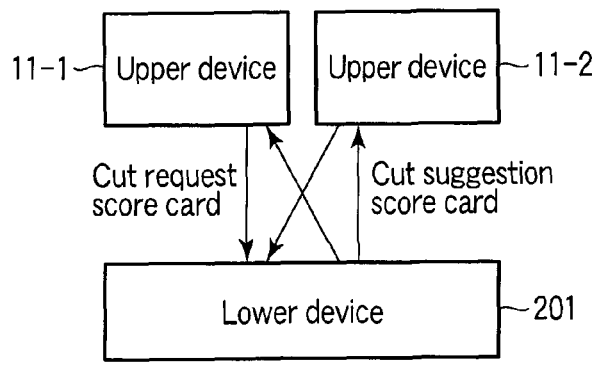
F I G. 33

| Cut request score card | | |
|---|---|---|
| Target facility type : | | Upper EMS(Service provider A) |
| Facility No. | | 1 |
| Time | | 1Hour |
| Predicted energy supply [kWh] | | 10 |
| Supply error | | ±0% |
| | | Adjustable energy range [kWh] |
| Reward eco point | 0 | 0 |
| | 1 | -3 |
| | 2 | -6 |
| | 3 | -9 |
| | 4 | |
| | 5 | |
| | 6 | |
| | 7 | |
| | 8 | |

F I G. 34

| Cut request score card | | |
|---|---|---|
| Target facility type : | | Upper EMS(Service provider A) |
| Facility No. | | 2 |
| Time | | 1Hour |
| Predicted energy supply [kWh] | | 10 |
| Supply error | | ±0% |
| | | Adjustable energy range |
| Reward eco point | 0 | 0 |
| | 1 | -0.5 |
| | 2 | -1 |
| | 3 | -1.5 |
| | 4 | -2 |
| | 5 | |
| | 6 | |
| | 7 | |
| | 8 | |

F I G. 35

| Cut request score card | | | |
|---|---|---|---|
| Target facility type : | | Lower EMS | |
| Facility No. | | | 1 |
| Time | | 1Hour | |
| Predicted energy demand [kWh] | | | 20 |
| Demand error | | ±0% | |
| | | Adjustable energy range [kWh] | |
| Reward eco point | 0 | | 0 |
| | 1 | | -1 |
| | 2 | | -2 |
| | 3 | | -3 |
| | 4 | | -4 |
| | 5 | | -5 |
| | 6 | | -6 |
| | 7 | | -7 |
| | 8 | | -8 |

F I G. 36

ENERGY MANAGEMENT SYSTEM AND ENERGY MANAGEMENT METHOD

CROSS-REFERENCE TO RELATED APPLICATIONS

This application is based upon and claims the benefit of priority from Japanese Patent Application No. 2009-208269, filed Sep. 9, 2009; the entire contents of which are incorporated herein by reference.

FIELD

Embodiments described herein relate generally to an energy management system which calculates an optimum adjustment amount in a case where an energy supply device requests an energy demand device to adjust the amount of energy to be supplied, and an energy management method.

BACKGROUND

In general, an air conditioner consumes much power at the peak of power consumption on a hot day in summer or the like. At the peak of the power consumption, when a set temperature of each air conditioner is merely raised as much as 2° C. to 3° C., power saving is noticeably realized. To realize the power saving, a demand side management (DSM) such as a load control system is suggested in which a power company and the like regulate the power consumption of an electric device (including the air conditioner) for a household, an office building and the like by remote control. Specifically, industry organization 'Echonet Consortium' for household apparatus control has started a demonstration experiment of a DSM service in Tokyo from November of 1999.

Examples of a control method concerning DSM include a restricting or peak cutting of the whole power load by forced load blocking (selective load blocking), and leveling of the load by a shift of the load use period of time. In a load adjustment logic of these control methods, a priority of the load to be blocked and an adjustment rule of the load need to be beforehand determined. This load adjustment logic is a unilateral energy management technology in which the state of the energy demand device is not taken into consideration.

Moreover, there is suggested a technology in which supply of energy from an energy supply device to energy demand device is managed only by the energy supply device. Document 1 (Jpn. Pat. Appln. KOKAI Publication No. 2002-10532) discloses an energy management system which manages the supply of the energy to the energy demand device. In Document 1, however, unilateral demand control from the energy supply device to the energy demand device is performed, and hence any request from the energy demand device to the energy supply device is not reflected.

Furthermore, in a demand prediction of the load in demand control such as a microgrid technology, load adjustment is not performed, but the demand is predicted by taking an operation of the load as a top priority into consideration. Therefore, in the demand control or operation planning, a limit of the adjustment is strictly determined, and the operation is difficult sometimes. To cope with these difficulties, facilities such as a privately owned power facility, a fuel cell and a power storage apparatus (an accumulator) for executing demand matching need to be beforehand installed, which increases costs.

BRIEF DESCRIPTION OF THE DRAWINGS

FIG. 1 is a block diagram showing an example of a hierarchical structure of an energy management system according to a first embodiment;

FIG. 3 is a block diagram showing a second example of transmission/reception between the energy management devices disposed in the energy management system according to the first embodiment;

FIG. 4 is a block diagram showing a third example of transmission/reception between the energy management devices disposed in the energy management system according to the first embodiment;

FIG. 6 is a table showing a first example of a score card used in the energy management system according to the first embodiment;

FIG. 7 is a table showing a second example of the score card used in the energy management system according to the first embodiment;

FIG. 8 is a table showing a third example of the score card used in the energy management system according to the first embodiment;

FIG. 9 is a table showing a fourth example of the score card used in the energy management system according to the first embodiment;

FIG. 10 is a table showing a fifth example of the score card used in the energy management system according to the first embodiment;

FIG. 11 is a block diagram showing a fourth example of transmission/reception between energy management devices disposed in the energy management system according to the first embodiment;

FIG. 12 is a block diagram showing a fifth example of transmission/reception between the energy management devices disposed in the energy management system according to the first embodiment;

FIG. 13 is a block diagram showing a sixth example of transmission/reception between the energy management devices disposed in the energy management system according to the first embodiment;

FIG. 14 is a block diagram showing a seventh example of transmission/reception between energy management devices disposed in the energy management system according to the first embodiment;

FIG. 18 is a block diagram showing a second example of transmission/reception between the energy management devices disposed in the energy management system according to the second embodiment;

FIG. 19 is a block diagram showing a third example of transmission/reception between the energy management devices disposed in the energy management system according to the second embodiment;

FIG. 20 is a table showing a first example of a score card used in the energy management system according to the second embodiment;

FIG. 21 is a table showing a second example of the score card used in the energy management system according to the second embodiment;

FIG. 24 is a block diagram showing a first example of transmission/reception between energy management devices disposed in the energy management system according to the third embodiment;

FIG. 25 is a block diagram showing a second example of transmission/reception between the energy management devices disposed in the energy management system according to the third embodiment;

FIG. 26 is a block diagram showing a third example of transmission/reception between the energy management devices disposed in the energy management system according to the third embodiment;

FIG. 27 is a table showing a first example of a score card used in the energy management system according to the third embodiment;

FIG. 28 is a table showing a second example of the score card used in the energy management system according to the third embodiment;

FIG. 29 is a table showing a third example of the score card used in the energy management system according to the third embodiment;

FIG. 31 is a block diagram showing a first example of transmission/reception between energy management devices disposed in the energy management system according to the fourth embodiment;

FIG. 32 is a block diagram showing a second example of transmission/reception between the energy management devices disposed in the energy management system according to the fourth embodiment;

FIG. 33 is a block diagram showing a third example of transmission/reception between the energy management devices disposed in the energy management system according to the fourth embodiment;

FIG. 34 is a table showing a first example of a score card used in the energy management system according to the fourth embodiment;

FIG. 35 is a table showing a second example of the score card used in the energy management system according to the fourth embodiment; and FIG. 36 is a table showing a third example of the score card used in the energy management system according to the fourth embodiment.

DETAILED DESCRIPTION

Figure 2:
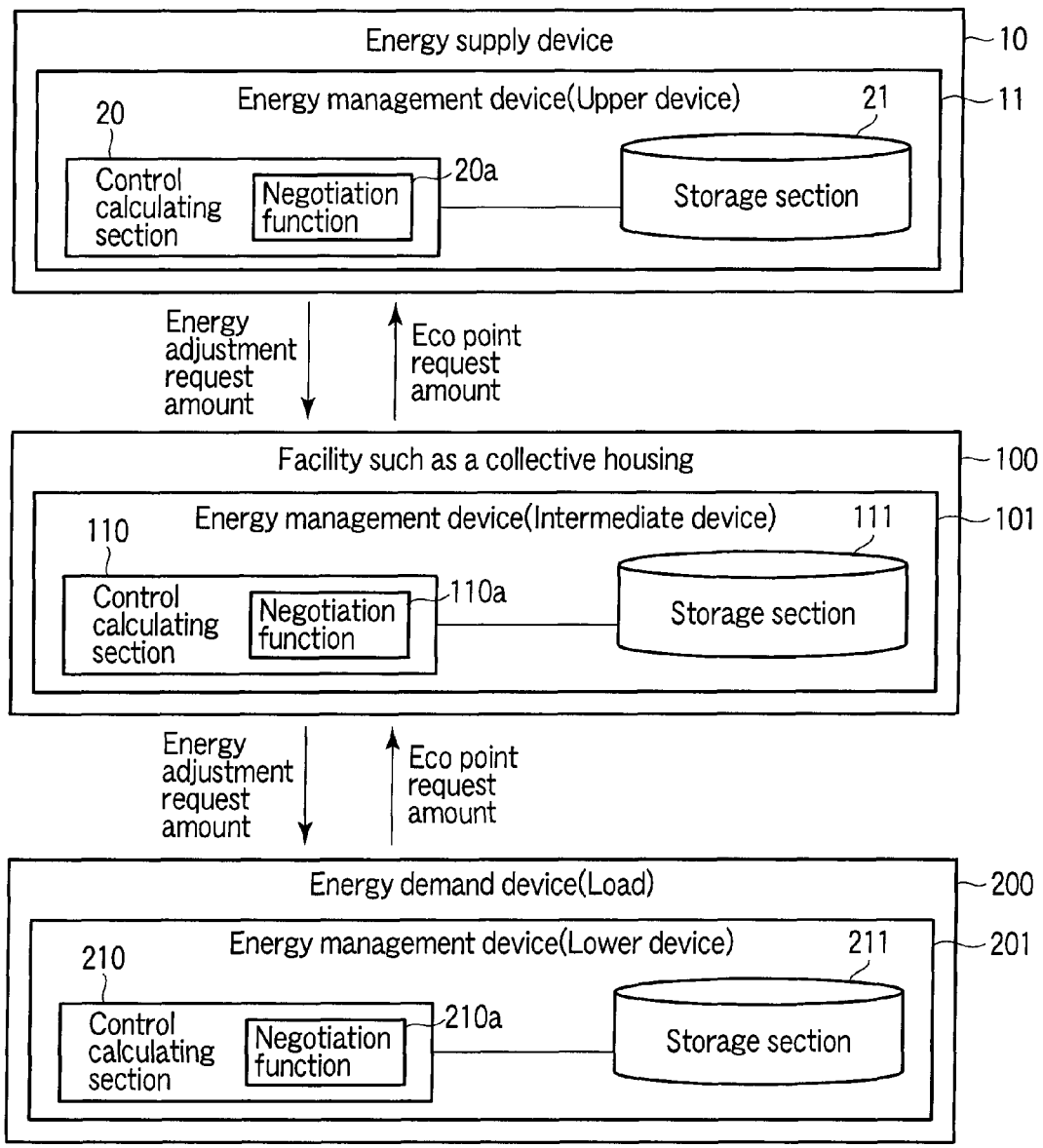
FIG. 2 is a block diagram showing a first example of transmission/reception between energy management devices disposed in the energy management system according to the first embodiment.

In general, according to embodiments, an energy management system includes an energy supply device and an energy demand device. Energy is supplied from the energy supply device to the energy demand device. The energy management system comprises a first energy management device, a second energy management device, storage sections, calculating sections. The first energy management device is applied for the energy supply device. The second energy management device is applied for the energy demand device. The storage sections are included in the first energy management device and the second energy management device, respectively, and in which a condition as to comply with an adjustment request of the energy supplied from the energy supply device to the energy demand device is stored. The calculating sections are included in the first energy management device and the second energy management device, respectively, and which cooperate to execute negotiation function calculating an energy adjustment amount satisfying the condition.

Embodiments will be explained below with reference to accompanying drawings. In the drawings, the same reference numbers and symbols denote the same or substantially same elements, and a description thereof will be omitted or briefly described. Only different parts will be explained in detail.

First Embodiment

An example of a constitution of an energy management system according to a first embodiment will be described with reference to FIG. 1. In the first embodiment, an energy supply device is, for example, a facility of a power company. The energy supply device supplies energy or a service to an energy demand device. It is to be noted that the energy supply device is not limited to the facility of the power company. The energy supply device may be, for example, a facility of an energy provider such as a gas company or a district heat supply company. Moreover, the energy provider device may be a facility of a service provider such as an emission right company, an energy management agency service company or an energy saving support service company for providing various services concerning energy management. Moreover, it is assumed that the energy demand device corresponds to at least one of various load facilities of energy consumer side. For example, the energy demand device may be a facility of a collective housing, an apartment building, office, tenamt, factory, or plant or the like. In the first embodiment, the energy demand device is a facility comprising at least one of various types of energy load devices (hereinafter referred to as the loads).

The energy management system 1 is a hierarchical type energy management system. The energy management system 1 comprises energy management devices 1-1, 1-2, 2-1 to 2-m and n-1 to n-m which belong to layers. As shown in FIG. 1, the energy management device of the energy supply device belongs to the uppermost layer (the first layer) of the energy management system 1 among the layers. The energy management devices of the uppermost layer are managed by the energy provider or the service provider. The energy demand devices comprise energy management devices n-1 to n-m of the lowermost layer (the n-th layer) and the loads L1 to Lm, respectively. In FIG. 1, the loads Lm-1 and load Lm are a distributed power source facility and a power storage device. The energy management system 1 has two layers at minimum, and has an n-layer constitution of two or more layers. In the energy management system 1, the number of the energy management devices and the number of the loads attached to the energy management devices increase in lower layers. In the energy management system 1 according to the first embodiment, the energy management devices of an intermediate layer can execute negotiation function for energy adjustment (regulation) with energy management devices of the upper and lower layers. That is, the energy management system 1 has a negotiating function of performing bidirectional communication among the energy management devices of the respective layers to regulate the adjustment amount of energy.

FIG. 2 is a block diagram showing a first example of a constitution of the three-layer energy management system 1.

An energy supply device 10 belongs to the first layer. A facility 100 of an energy management organization of the collective housing, a building management organization of a tenant building or the like belongs to the second layer. An energy demand device 200 used in each household, each building tenant or the like belongs to the third layer. The layers are connected to one another via a network such as a telephone network or internet. It is to be noted that in FIG. 2, a plurality of devices may be present in each layer as shown in FIG. 1.

The layers comprise the energy management devices 10, 101 and 201, respectively. The energy supply device 10 comprises an upper energy management device (hereinafter referred to as the upper device) 11. The facility 100 comprises an intermediate energy management device (hereinafter referred to as the intermediate device) 101. The energy demand device 200 comprises a lower energy management device (hereinafter referred to as the lower device) 201. The upper device 11 comprises a control calculating section 20. The intermediate device 101 comprises a control calculating section 110. The lower device 201 comprises a control calculating section 210.

The control calculating sections 20, 110, and 210 includes negotiation functions 20a, 110a, and 210a, respectively.

An energy adjustment request (e.g., an energy cut (reduce) request) transmitted from the energy supply device 10 is transmitted to the energy demand device 200 via the facility 100. On receiving the energy adjustment request, the intermediate device 101 of the facility 100 and the lower device 201 of the energy demand device 200 perform bidirectional communication referred to as negotiation with respect to the upper device 11 of the energy supply device 10. The negotiation is generically transmission/reception where one device provides a request condition concerning energy adjusting and the other device provides a possible condition or reward (compensation) condition with respect to the request condition. The request condition (an eco point, a score card, etc. described later) is stored in at least one of a storage section 21 of the energy supply device 10, a storage section 111 of the facility 100 and a storage section 211 of the energy demand device 200. The control calculating sections 20, 110 and 210 include functions of distributing an energy adjustment request amount and adding up (calculating) eco point request amounts.

It is to be noted that in the first embodiment, a common measure such as an eco point is introduced to quantitatively represent, by numeric values, a reward condition with respect to an adjustment of the amount of the energy from the upper device 11 to the lower device 201. The eco point is a reward for the adjustment of the energy. The eco point can be treated as a local money which can equivalently be exchanged for an economic value or an emission right if necessary. The reward eco point is an index value corresponding to the size of the adjustment amount of the energy. In the energy demand device 200, the index value (the eco point) which is the reward for the energy adjustment is beforehand set. For example, the eco point is associated with a digitalized energy cut amount for each period of time when the adjustment is performed, and registered in table data (the score card). The energy adjustment amount is the amount of the energy to be adjusted with respect to the adjustment request of the amount of the energy to be supplied from the energy supply device 10 to the energy demand device 200. The adjustment request is transmitted from the energy supply device 10 to the energy demand device 200. The adjustment amount of the energy may be energy consumption cutting (decrease) such as energy saving or power saving, or energy consumption increase for stabilizing a power system or increasing an operation efficiency.

In the first embodiment, data referred to as the score card is used in information transmission executed for the negotiation to regulate the energy adjustment amount. The score card includes an attribute value concerning the adjustable energy amount.

The score card includes, as the attribute value concerning the adjustable energy amount, for example, at least one of:

1. information of an adjustable amount of an energy consumption (utilization) of the load in the lower device 201 of the energy demand device 200;

2. information of a shiftable amount in a time direction in a case where a time to generate the energy consumption of the load is shifted;

3. information of an operation time of the load (the utilization time of the energy) or an adjustment amount of an accumulated energy of the load;

4. information of a propriety (possibility) of blocking of the energy consumption of the load (forced load blocking); and 5. information of the consumption of the load or an amount of energy to be generated, and an error amount or an error ratio thereof (a specific value of a variance range of the energy consumption of a load whose demand cannot be predicted such as a non-networking load or a variance range of the amount of the power to be generated by a distributed power source whose amount of the power to be generated cannot be predicted such as the solar power generation or the like).

At least one of the attribute values is registered in the score card. The score card is data indicating a relation between the attribute values. In the first embodiment, the score card is table data in which the adjustable amount of the energy is associated with the eco point indicating the value measure of the amount (described later with reference to FIG. 6 or the like).

In the score card, in addition to the energy adjustment amount like the present instantaneous value, it is possible to register, as another attribute value, the energy adjustment amount in which a predicted value with respect to a time axis is reflected.

As shown in FIG. 2, when the energy adjustment request amount (e.g., the cutting request of the energy supply amount) is transmitted from the energy supply device 10 to the energy demand device 200 via the facility 100, the plurality of upper devices 11, the plurality of intermediate devices 101 and the plurality of lower devices 201 mutually regulate the adjustment amount of the energy (the negotiation) by bidirectional communication.

That is, between the upper device 11 and the intermediate device 101 and between the intermediate device 101 and the lower device 201, the negotiation is executed concerning (1) the energy adjustment request value and eco point request amount, (2) the provideable eco point amount and adjustable energy amount, (3) the score card and the energy adjustment amount or providing eco point amount matching the score card, and the like (described later).

In the negotiation among the upper device 11, the intermediate device 101 and the lower device 201, for example, the energy adjustment request amount is transmitted (provided) from the upper device 11 to the lower device 201 via the intermediate device 101, and the eco point request amount corresponding to this energy adjustment request amount is returned from the lower device 201 to the upper device 11 via the intermediate device 101.

In the negotiation among the upper device 11, the intermediate device 101 and the lower device 201 shown in FIG. 3, for example, the provideable eco point amount is transmitted from the upper device 11 to the lower device 201 via the intermediate device 101, and the adjustable energy amount with respect to the provideable eco point amount is returned from the lower device 201 to the upper device 11 via the intermediate device 101.

In the negotiation among the upper device 11, the intermediate device 101 and the lower device 201 shown in FIG. 4, for example, the request for the score card is transmitted from the upper device 11 to the lower device 201 via the intermediate device 101, and in response to this request, the score card is transmitted from the lower device 201 to the upper device 11 via the intermediate device 101. Afterward, the energy adjustment amount matching the condition of the score card is transmitted from the upper device 11 to the lower device 201 via the intermediate device 101, to give the eco point to the lower device 201. The lower device 201 has a negotiating function 210a with respect to the plurality of intermediate devices 101. For example, the lower device 201 has a negotiating function 210a of selecting one intermediate device 101 or a combination of the plurality of intermediate devices so as to minimize the sum of the necessary energy cut amounts or maximize the sum of the requestable eco points (described later). It is to be noted that negotiation will be described later in detail.

The intermediate device 101 has a function of adding the plurality of score cards of the lower device 201 to the condition of the calculation in the negotiation to divide the energy adjustment request amount or provideable eco point amount transmitted from the upper device 11 into the energy adjustment request amounts or provideable eco point amounts with respect to the plurality of lower devices 201; a function of adding up the adjustable energy amounts or eco point request amounts returned from the lower devices 201 to return the adjustable energy amount or eco point request amount to the upper device 11, and the like.

Furthermore, the intermediate device 101 has a cycle regulating function of allowing the varying cycles of the negotiation among the upper device 11, the intermediate device 101 and the lower device 201 to locally regulate the inconformity of this cycle of the negotiation. The intermediate device 101 has a regulating function of regulating a case where the cycle of the negotiation between the upper device 11 and the intermediate device 101 is different from that of the negotiation between the intermediate device 101 and the lower device 201 or the load of the energy demand device 200 (e.g., a case where one cycle is one hour and the other cycle is one minute or the like). This regulating function solves the mismatch of the cycle of the negotiation by adjusting local energy load distribution or utilizing the power storage device.

The intermediate device 101 has a function of executing change corresponding to a request received from the upper device 11 or the lower device 201 with respect to a self database to return a completion notice of the execution to the upper device 11 or the lower device, when newly receiving an addition request, a cancellation request or a deletion request from the upper device 11 or the lower device 201 (described later).

The intermediate device 101 and the lower device 201 have a function of summing up the eco points obtained by the negotiation with the upper device 11 to perform, for example, settlement or the like with respect to an device of an eco point/service provider. The upper device 11 has a function of summing up the eco points provided by the negotiation with the intermediate device 101 or the lower device 201, to perform settlement or the like with respect to the device of the eco point/service provider (described later).

(Various Management Functions of Score Card)
(Display/Edition, Database, Template, Infer Function)

Figure 5:
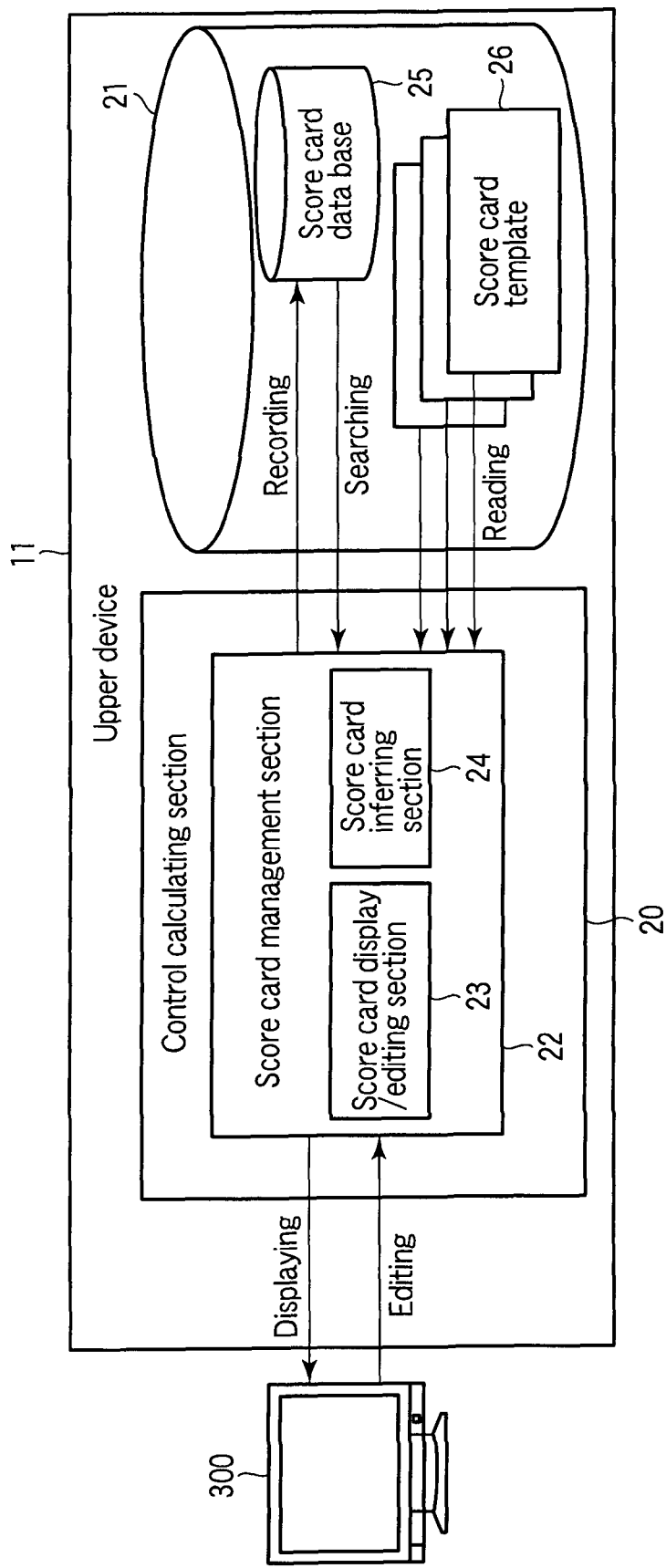
FIG. 5 is a block diagram showing an example of a score card management section of the energy management system according to a first embodiment.

FIG. 5 is a block diagram showing an example of a constitution of a score card management function disposed in each energy management device. It is to be noted that the upper device 11 of the energy supply device 10 will be described as an example with reference to FIG. 5, but this also applies to the intermediate device 101 and the lower device 201.

The control calculating section 20 of the upper device 11 comprises a score card management section 22. The score card management section 22 has a score card distribution/synthesis calculating function of performing the synthesis and distributing calculation of the information of the score card; a function of managing a score card database 25 (a recording function, a search function); a function of reading a template 26 for each energy demand device 200 from the storage section 21; various management functions of the score card; a function of selecting the upper device 11 in a case where the plurality of upper devices 11 are present; a function of distributing the request to the plurality of upper devices 11; a managing function of the new addition of energy adjustment to be executed by the upper device 11, the intermediate device 101 and the lower device 201, and cut cancellation; a settlement function concerning the conversion of the eco point into the emission right or economic value based on a preset conversion rate, and the like.

The score card management section 22 comprises a score card display/editing section 23 and a score card inferring section 24. The score card display/editing section 23 displays/edits the score card. The score card inferring section 24 searches for inferring data based on the database of past results (data having a high possibility of matching data acquired from the past data) to display a search result in a connected input/output terminal 300 or the like.

Hereinafter, various management functions of the score card will be described in detail. The energy management system 1 of the first embodiment has the following functions as the various management functions of the score card used in the negotiation.

(a) The score card management section 22 has the display function and editing function of the score card by the input/output terminal 300. Specifically, the score card management section 22 executes processing to display and edit the attribute value of each score card shown in FIG. 6 to FIG. 10 based on the operation of the input/output terminal 300.

(b) The storage section 21 comprises the score card database 25. The score card management section 22 has a function of recording the past attribute value of the score card in the score card database 25 and a function of searching for the attribute value for each condition from the score card database 25.

Specifically, the score card management section 22 has a function of recording the score card obtained by the synthesis calculation or the like for each time together with a load type, season, date, period of time and the like in the score card database 25; a function of receiving a search condition such as a load, season, date or period of time to search for the corresponding score card from the score card database 25 in accordance with past instances and the like.

(c) The storage section 21 beforehand stores the score card template 26. In the score card template 26, a typical default value of the score card is described for each load. The score card management section 22 can read the default score card to immediately utilize the default card when utilizing for each score card is occurred.

(d) The score card management section 22 has a function of reading the attribute value of the score card from the score card database 25 and executing inferring. Specifically, the score card management section 22 calculates an average value of the past score cards extracted based on the search condition such as the load, season, date or period of time by the above database search function (b), to use the calculated average value of the past score cards as the inferred value of the score card with respect to the searched corresponding condition.

Operation/Function of Energy Management System 1 According to First Embodiment

An example of an operation/function of the energy management system 1 according to the first embodiment will be described.

(Negotiation Model between Layers)

(Negotiation by Bidirectional Communication, Score Card: Adjustment Amount and Eco Point)

In the energy management system 1 according to the first embodiment, an adjustment of the energy adjustment amount between the energy management devices of the layers is realized by the negotiating function 20a, 110a, and 210a using the bidirectional communication. The negotiating function 20a, 110a, and 210a uses the score card in which the adjustable energy amounts are associated with the eco points indicating the value measures of the amounts.

(Description of Functions/Characteristics of Score Cards)

(Five Attribute Values Concerning Energy Adjustment Amount, Eco Point Representation and Time Axis Representation)

Examples of the score card used in the negotiation are shown in FIG. 6 to FIG. 10. As described above, in the score card, there is described the attribute value concerning the adjustable energy amount of at least one of (1) a adjustable (regulateable) load amount, (2) a shiftable load amount, (3) a adjustable load operation time or adjustable accumulated energy amount, (4) the propriety of the load adjustment blocking and (5) the consumption of the load or the amount of the energy to be generated, and the error amount or the error ratio thereof.

FIG. 6 to FIG. 10 show, as one example, the score card in a case where the energy demand device 200 is the facility of the general household. FIG. 6 shows an example of a case where the load included in the energy demand device 200 is an air conditioner. FIG. 7 shows an example of a case where the load is a washing machine. FIG. 8 shows an example of a case where the load is a solar power generation facility. FIG. 9 shows an example of a case where the load is TV. FIG. 10 shows an example of a case where the load is outdoor light.

A score card shown in FIG. 6 includes an adjustable range of the air conditioner (the energy adjustable range), and also includes an eco point number requested as a reward (a reward eco point). The eco point is an index value which is used to request a reward from one device (the intermediate device 101 or the lower device 201) to another device (the energy supply device 10) in a case where the one device accepts the energy adjustment request from the other device. For example, when the score card is used, the intermediate device 101 or the lower device 201 can decrease in a request range of the energy adjustment request. Moreover, the score card includes a set eco point generated in a case where the energy demand device 200 or the load is forcibly blocked from the upper device 11.

A score card shown in FIG. 7 includes a shiftable period of time of the washing machine (an energy shiftable period of time), and includes an eco point requested as the reward in each period of time in a case where execution time is shifted to a shiftable period of time. Moreover, the score card includes a set eco point generated in a case where energy supply from the upper device 11 is forcibly blocked.

A score card shown in FIG. 8 is used to adjust the load of the solar power generation facility. In the load adjustment of the solar power generation facility, it is difficult to predict the load and to correctly predict the amount of the power to be generated. Therefore, the score card includes a predicted value of the amount of the power to be generated (energy demand prediction) and an error ratio of the predicted value (demand error). Moreover, the score card includes a set eco point generated in a case where energy supply from the upper device 11 is forcibly blocked.

A score card shown in FIG. 9 is used in the load adjustment of the TV, and includes an operation time when the load adjustment can be performed (a daily operation time adjustable range). An operation time when the load adjustment of the TV can be performed is, for example, a total use time when a TV switch is turned on in a day.

A score card shown in FIG. 10 includes a period of time when a load can forcibly be blocked with respect to the outdoor light. The score card includes an eco point generated in a case where the energy supply from the upper device 11 is forcibly blocked.

The above score card includes an eco point corresponding to each adjustable energy amount (a converted eco point value). Moreover, in the above score card, a predicted future value is associated with a time axis. A period of time included in the score card includes a time after the present period of time.

(Details of Negotiating Functions 20a, 110a, and 210a Between Layers)

(Negotiation)

Negotiating functions 20a, 110a, and 210a in the energy management system 1 according to the first embodiment is classified as follows.

(1) As shown in FIG. 2, the upper device 11 has the negotiating function 20a of transmitting the energy adjustment request amount to the intermediate device 101 or the lower device 201 and receiving the eco point requested from the intermediate device 101 or the lower device 201.

(2) As shown in FIG. 3, the upper device 11 has the negotiating function 20a of transmitting the provideable eco point to the intermediate device 101 or the lower device 201 and receiving the realizable energy adjustment amount from the intermediate device 101 or the lower device 201.

(3) As shown in FIG. 4, the upper device 11 has the negotiating function 20a of requesting the score card with respect to the intermediate device 101 or the lower device 201 and receiving the score card from the intermediate device 101 or the lower device 201.

(4) As shown in FIG. 11, the negotiating function 20a of the upper device 11 includes a distributing/adding section 11a which distributes the energy adjustment request amount and processes (adds up) eco point request amounts. The distributing/adding section 11a of the upper device 11 has a function of adding up the score cards collected from the intermediate device 101 or the lower device 201 to prepare a self score card.

(5) As shown in FIG. 12, the lower device 201 or the intermediate device 101 has a negotiating function 210a or 110a of transmitting the self score card to the upper device 11 and receiving, from the upper device 11, the energy adjustment amount and eco point which match the score card.

(6) As shown in FIG. 13, the intermediate device 101 has the negotiating function 110a of receiving the energy adjustment request amount from the upper device 11, calculating the distribution of the energy adjustment amount to the lower devices 201 so that the energy adjustment request amount is satisfied and the corresponding total eco point amount is minimum, and transmitting a calculated minimum total eco point amount to the upper device 11.

(7) As shown in FIG. 14, the intermediate device 101 has the negotiating function 110a of receiving the provideable eco point amount from the upper device 11, calculating the eco point distribution to the lower devices 201 so as to maximize the total amount of the corresponding energy adjustment amounts within the range of the provideable eco point amounts, and transmitting a calculated total eco point amount to the upper device 11.

The above negotiating functions 20a, 110a, and 210a are generically processing of performing the transmission/reception of the energy adjustment request amount, the adjustable energy amount, the corresponding provideable eco point amount, the total eco point amount (the eco point request amount), the score card and the like, to adjust each condition. Consequently, the negotiating functions 20a, 110a, and 210a can optimally distribute the energy adjustment request amount or provideable eco point amount from the upper device 11 to the plurality of lower devices 201. The negotiating functions 20a, 110a, and 210a can optimally distribute optimally distribute the adjustable energy amount or total eco point amount to the plurality of upper devices 11. Furthermore, the negotiating function 20a, 110a, and 210a comprises the managing function of the addition/deletion of the energy management devices in the upper layer or lower layer, the conversion settlement function of the eco point into the emission right or economic value and the like.

The lower device 201 has the negotiating function 210a for the plurality of upper devices 11 or the plurality of intermediate devices 101. This negotiating function 210a selects one upper device 11 or one intermediate device 101 or a combination of a plurality of devices so as to minimize the sum of the necessary energy adjustment amounts or maximize the sum of requested eco points.

The energy management device belonging to any one of a plurality of layers optimizes the distributing of the energy adjustment amount or the eco point through the negotiation with energy management devices of the lower and upper layers.

<Optimum Distribution of Energy Adjustment Request Amount to Lower Layer>

Restricting Conditions: energy adjustment request amount from the upper layer=$\Sigma$ (the energy adjustment request amount distributed to the i-th lower layer)

Minimization: an optimization problem indicating $\Sigma$ (the eco point request amount of the i-th lower layer) is solved to calculate the optimum distribution.

<Optimum Distribution of Provideable Eco Point Amount to Lower Layer>

Restricting conditions: provideable eco point amount from the upper layer=$\Sigma$ (the provideable eco point amount distributed to the i-th lower layer)

Maximization: an optimization problem indicating $\Sigma$ (the adjustable energy amount of the i-th lower layer) is solved to calculate the optimum distribution.

<Optimum Distribution of Adjustable Energy Amount to Upper Layer>

Restricting conditions: the adjustable energy amount of the lower layer=$\Sigma$ (the adjustable energy amount distributed to the j-th upper layer)

Maximization: an optimization problem indicating $\Sigma$ (the eco point request amount to the j-th upper device 11) is solved to calculate the optimum distribution.

<Optimum Distribution of Provideable Eco Point Amount to Upper Layer>

Restricting conditions: the provideable eco point amount of the lower layer=$\Sigma$ (the provideable eco point amount distributed to the j-th upper layer)

Minimization: an optimization problem indicating $\Sigma$ (the adjustable energy amount of the j-th upper layer) is solved to calculate the optimum distribution.

Specific procedures of the above functions will be described.

The function of optimally distributing the energy adjustment request amount or provideable eco point amount from the upper device 11 to a plurality of lower layers (the intermediate device 101 and the lower device 201) is as follows, for example, in a certain time section during the use of the air conditioner, the washing machine and the TV.

With respect to the air conditioner (1000 W), the eco point corresponding to the adjustment amount, for example, ten eco points are requested with respect to a cut of 10%. However, the adjustment range of the air conditioner is restricted to 50%.

When washing is postponed in the washing machine (500 W), 25 eco points are requested.

When the use of the TV (300 W) is discontinued, 60 eco points are requested.

<Optimum Distribution of Energy Adjustment Request Amount to Lower Layer>

The energy adjustment request amount from the upper layer, which is a restricting condition, is 800 W. At this time, to minimize the sum of the eco points supplied to the lower layer=the air conditioner+the washing machine+the TV, the energy of the air conditioner is decreased as much as 300 W, the washing machine is turned off owing to the postponing of the washing to decrease the energy thereof as much as 500 W, and the TV maintains the present state. In consequence, the sum of the eco points supplied to the lower layer is 30+25=55 points. This reason is that the power cut amount per eco point is the air conditioner=10 W/point, the washing machine=20 W/point and the TV=5 W/point. Therefore, first, it is most efficient to turn off the washing machine. Next, it is efficient to cut the energy of the air conditioner in a possible range.

<Optimum Distribution of Provideable Eco Point Amount to Lower Layer>

As a restricting condition, the provideable eco point amount from the upper layer is 50 points. In this case, to maximize the adjustable energy amount of the lower layer, the energy of the air conditioner is decreased as much as 250 W, the washing machine is turned off owing to the postponing of the washing to decrease the energy thereof as much as 500 W, and the TV maintains the present state. This reason is similar to the above reason. It is most efficient to postpone the washing by the washing machine, it is secondly efficient to cut the energy of the air conditioner, and it is thirdly efficient to turn off the TV.

On the other hand, when the provideable eco point amount from the upper layer is 80 points, the energy of the air conditioner is decreased as much as 500 W, the washing machine is turned off to decrease the energy thereof as much as 500 W, and the TV is used while maintaining the present state. The eco points in this state are 75 points. A reason for such control is that the adjustment range of the air conditioner is restricted to be 50%, and it is better to cut the energy consumption of the air conditioner with five points being unused than to use 60 points for turning off the TV.

Thus, in the above optimization, complicated distributing calculations in various cases can systematically be performed.

Next, the function of optimally distributing the adjustable energy amount or the eco point request amount to the plurality of upper devices 11 will be described. For example, in the upper layer, a facility of company A and a facility of company B are present as eco point supply service providers. At a certain time, the company A imparts one eco point with respect to the cut of 10 W, and imparts 30 eco points at maximum. The company B imparts one eco point with respect to the cut of 20 W, and the number of the eco points to be imparted is not limited.

<Optimum Distribution of Adjustable Energy Amount to Upper Layer>

The above air conditioner will be investigated. To maximize the eco points requested from the upper layer, the lower layer decreases the energy of the air conditioner as much as 500 W to the maximum, acquires 300 W=30 points from the company A, and acquires the remaining 200 W=10 points from the company B, thereby acquiring 40 points in total.

<Optimum Distribution of Provideable Eco Point Amount to Upper Layer>

To set the eco points provided from the upper layer to the lower layer to 35 points at maximum and to minimize the energy adjustment amount, the lower layer decreases the energy of the air conditioner as much as 400 W, acquires 300 W=30 points from the company A, and acquires the remaining 100 W=5 points from the company B, thereby acquiring 35 points in total.

The score card management section 22 for the control calculating sections 20, 110 and 210 comprises the distributing/adding section 11a which performs the synthesis and distributing calculation of the score card. For example, in the lower device 201, the score cards corresponds to five types of facilities (the air conditioner, the washing machine, the solar power generation facility, the TV and the outdoor light) shown in FIG. 6 to FIG. 10. The distributing/adding section 11a of the upper device 11 synthesizes, for example, the score cards for the five types of facilities into one score card.

For example, the score card for the air conditioner (1000 W) includes relations of 10 points to a cut of 100 W, 20 points to a cut of 200 W, . . . , and 50 points to a cut of 500 W. The score card for the washing machine (500 W) includes a relation of 25 points to a cut of 500 W. The score card for the TV (300 W) includes a relation of 60 points to the discontinuation of the use. The calculation described above in each example is executed in accordance with the score card. The score cards can be synthesized. For example, in the example of the optimum distribution of the energy adjustment request amount to the lower device 201, when a cut amount is from 0 W and less than 490 W, the eco point is acquired from 0 point to 49 points by cutting the energy of the air conditioner. When the cut amount is 500 W, the washing machine is turned off to acquire 25 points. When the cut amount is above 500 W to 1000 W, the washing machine is turned off and the energy of the air conditioner is cut to acquire the eco point from 25 to 75 points. When the cut amount is above 1000 W to 1300 W, the TV is turned off to acquire the eco point from 105 to 135 points. These relations are included in the synthesized score card.

(Inconformity Elimination Processing of Cycle of Negotiation, Processing of Upper Layers, Increase/Decrease Management of Upper Layer and Lower Layer, and Conversion/Settlement of Eco Point)

As shown in FIG. 1, the energy management system 1 according to the first embodiment has a constitution of three or more layers including the upper layer (the first layer), the intermediate layer (from the second layer to the n-1-th layer) and the lower layer (the n-th layer). The energy management devices 2-1 to 2-m of the intermediate layer allow that the cycle of the negotiation with the energy management devices 1-1 and 1-2 of the upper layer is different from the cycle of the negotiation with the energy management devices n-1 to n-m including the loads L1 to Lm of the lower layer. The energy management devices 2-1 to 2-m of the intermediate layer has a regulating function of adjusting the local energy load distribution or utilizing the power storage device to solve mismatch in the case of the occurrence of the mismatch of the negotiation cycle.

For example, there will be described a case where the upper layer notifies the energy adjustment request amount by a unit of one hour, whereas the lower layer needs a load adjustment control by a unit of one minute. In this case, the energy management devices 2-1 to 2-m positioned in the intermediate layer divide, into the energy adjustment amounts of a lower device, the energy adjustment amount to be satisfied with respect to the upper layer in one hour. As the condition of this distribution, the adjustment is performed so that the energy adjustment amount to be satisfied with respect to the upper device in one hour=$\Sigma\Sigma$ (the energy adjustment amount of the i-th lower layer for a time of k minutes).

Here, when a part of the lower layer is the power storage device, the charge/discharge amount for the power storage device is adjusted. When a part of the lower layer is the solar power generation facility, it is difficult to predict the amount of the power to be generated by this solar power generation facility. Therefore, an accumulated value for one hour is calculated, the distribution of the load or the power storage device is adjusted, thereby executing demand control or simultaneous commensuration control so as to match the energy adjustment amount requested by the upper layer for one hour.

Furthermore, the energy management system 1 of FIG. 1 assumes a case where a new energy management device is added to the upper layer or the lower layer in a certain time or a case where the energy management device of the upper layer or the lower layer partially drops down. In this case, the energy management device of the intermediate layer has a function of executing a change with respect to the database of the energy management device of the intermediate layer based on the request received from the energy management device of the upper layer or the lower layer and returning the completion notice of the execution to the energy management device of the upper layer or the lower layer, when newly receiving an addition request or receiving a cancellation/deletion request from the energy management device of the upper layer or the lower layer. In consequence, it is possible to flexibly cope with the structure change of the energy management system 1 of FIG. 1.

In the energy management system 1 according to the first embodiment, the energy management device of the intermediate layer or lower layer processes (sums up) the eco points acquired by the negotiation executed between the device and the energy management device of the upper layer. Moreover, the energy management device of the upper layer processes (sums up) the eco points provided by the negotiation executed between the device and the energy management device of the intermediate layer or lower layer. For example, the energy management device of the eco point/service provider has a function of performing the settlement based on the summed eco points. In the settlement, the eco point is exchanged for a price per eco point or an equivalent emission right based on a contract condition determined between the eco point/service provider and an eco point acquirer. In consequence, the reward for the energy adjustment (load adjustment) of each energy demand device can be settled, and a reward can be provided with respect to an owner of the energy demand device. Moreover, the positive load adjustment, the energy saving of the whole society, the power saving and a rational energy operation can be realized.

In the above first embodiment, the cutting of the energy in the adjustment of the energy has mainly be described, but the embodiment also applies to a case where the energy is increased. The functions of the upper device 11, the intermediate device 101 and the lower device 201 can be reversed. For example, the lower device 201 may transmit a necessary energy increase amount to the upper device 11 via the intermediate device 101, and the upper device 11 may request the lower device 201 to pay the eco point corresponding to the energy increase amount, via the intermediate device 101.

Effect of Hierarchical Type Energy Management System 1 According to First Embodiment According to the above first embodiment, it is possible to perform the bidirectional energy management in which a request from the energy demand device to the energy supply device is reflected. Furthermore, following effects are obtained.

The energy management system 1 has a hierarchical constitution of two or more layers. In consequence, it is possible to smoothly manage or execute the energy adjustment, load adjustment, load distribution, reward settlement and the like among stake holders having complicated stakes, for example, the energy provider or the service provider, the management organization of a collective housing or a building, each household or each building tenant and the like.

The energy adjustment request of the whole energy management system 1 can optimally be distributed to the lower layers. Unilateral load adjustment is not imposed on the energy demand device 200 including the load, but smooth energy adjustment can be performed by bidirectional negotiation. In the negotiation, the score card is used in which the adjustable amount of the energy is associated with the eco point indicating the value measure of the energy, whereby it is possible to quickly and rationally make the determination of the adjustment/burden distribution between the stake holders having the stakes.

In the first embodiment, the load adjustment/load control for the energy adjustment is executed by using the attribute value for each load of each energy demand device, for example, the adjustable load amount of the energy, the shiftable load amount, the load operation time/adjustable accumulated energy amount, the propriety of the load adjustment blocking, the consumption of the load or the amount of the energy to be generated and the error amount or the error ratio, or the like. This affordably enables flexible load adjustment/load control. Moreover, the respective reward measures for the load adjustment can be quantified by the eco point, and the settlement of the rewards can smoothly be performed. Furthermore, since the score card is used, the adjustment can be executed by using the predicted future value along a time axis. Therefore, the energy management and energy management optimization can be performed based on not only each instantaneous time section but also the predicted value along the time axis.

The negotiation includes various means for the negotiation by the energy adjustment request amount or the adjustable energy amount, the negotiation by the provideable eco point amount and the eco point request amount, the negotiation by the score card and the like. This enables flexible load adjustment/load control in accordance with situations, whereby the optimum distribution of the load adjustment/load control from the upper layer to the lower layer can rationally be determined.

In the first embodiment, the score card is used to transmit information on the negotiation. Furthermore, the energy management system 1 has various management functions of the score card, for example, the display/editing function of the score card, the database management function, the template function for each load, the inferring function based on the database of the past results and the like. In consequence, the negotiation can smoothly be executed.

Moreover, the energy management system 1 can execute the processing also in a case where the cycle of the negotiation with the upper layer is different from that of the negotiation with the lower layer. Therefore, for example, even when the energy supply device 10 provides services with respect to a large number of energy demand devices 200 from several hundreds of devices to several tens of millions of devices, the management of the energy by a unit of one day to one hour can be performed by the energy management device of the upper layer, and in the local energy management device of the lower layer, each load can be controlled by a unit of one minute to one second. In consequence, the energy management/control can be executed by an optimum management/control cycle for each layer.

When the plurality of upper devices 11 are present for the intermediate device 101, it is possible to optimally select the upper device 11 or distribute the request to the plurality of upper devices 11 in consideration of the adjustable self energy amount or the requested eco point. For example, the optimum upper device 11 can be selected from the plurality of upper devices 11, and electricity is purchased from the plurality of upper devices 11, whereby the load adjustment request from the plurality of upper devices 11 can optimally be distributed and met.

Moreover, when the upper device 11, the intermediate device 101, the lower device 201, the load or the like is added or deleted, each energy management device can acquire the notice of the addition or deletion to automatically cope with the addition or deletion. In consequence, the structure of the energy management system 1 can flexibly be changed.

Furthermore, since the energy management system 1 has a settlement function of converting the eco point into the emission right or the economic value, the system can smoothly settle the stakes with the plurality of energy management devices and the plurality of loads.

Second Embodiment

A constitution of an energy management system according to a second embodiment will be described with reference to FIG. 15. In the second embodiment having a one to one constitution, a negotiation is executed between energy management devices.

Figure 15:
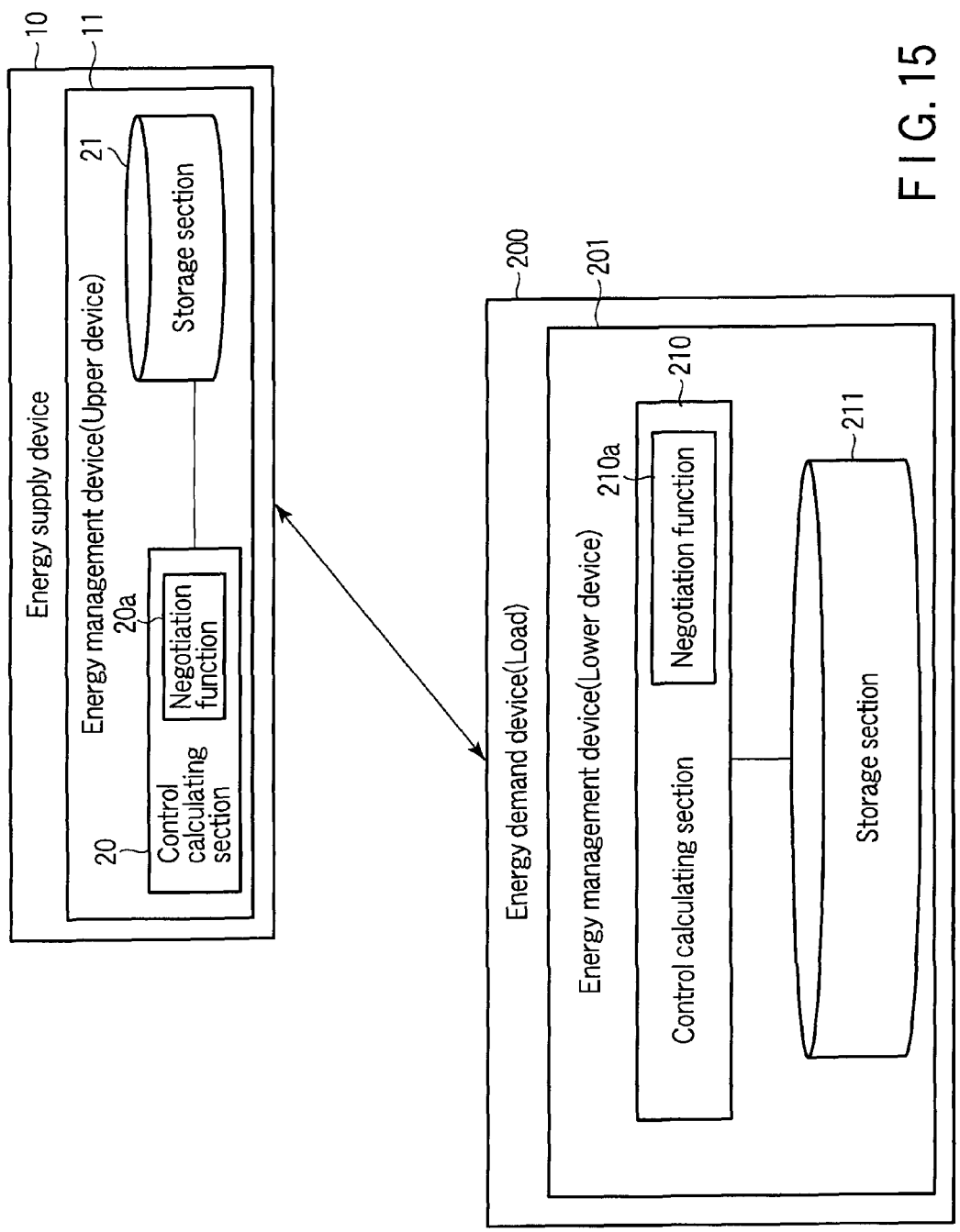
FIG. 15 is a block diagram showing an example of a structure of an energy management system according to a second embodiment.

FIG. 15 is a block diagram showing an example of a constitution of the hierarchical type energy management system according to the second embodiment. As shown in FIG. 15, the second embodiment is different from the first embodiment in that the upper device 11 of the energy supply device 10 and the lower device 201 of the energy demand device 200 perform bidirectional communication in a relation of one to one.

The energy management system of the second embodiment comprises the energy supply device 10 and the energy demand device 200. The energy supply device 10 comprises the upper device 11. The upper device 11 comprises the control calculating section 20 and the storage section 21.

Furthermore, the energy demand device 200 comprises the lower device 201. The lower device 201 comprises the control calculating section 210 and the storage section 211.

In the second embodiment, for example, a power is supplied as energy from the energy supply device 10 to the energy demand device 200. When the adjustment request of the amount of the energy to be supplied is transmitted from the energy supply device 10 to the energy demand device 200, the negotiation function 20a of the upper device 11 and the negotiation function 210a of the lower device 201 perform the bidirectional communication to adjust the adjustment amount of the energy based on the condition beforehand stored in the upper device 11 and the lower device 201.

Operation/Function of Hierarchical Type Energy Management System According to Second Embodiment Next, an operation/function of the energy management system according to the second embodiment will be described with reference to FIG. 16 and FIG. 17.

Figure 16:
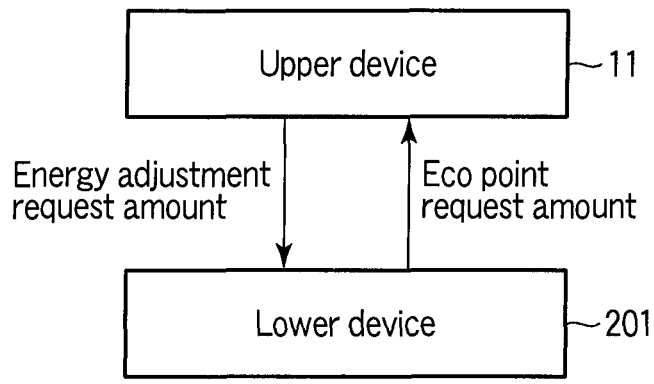
FIG. 16 is a block diagram showing a first example of transmission/reception between energy management devices disposed in the energy management system according to the second embodiment.
Figure 17:
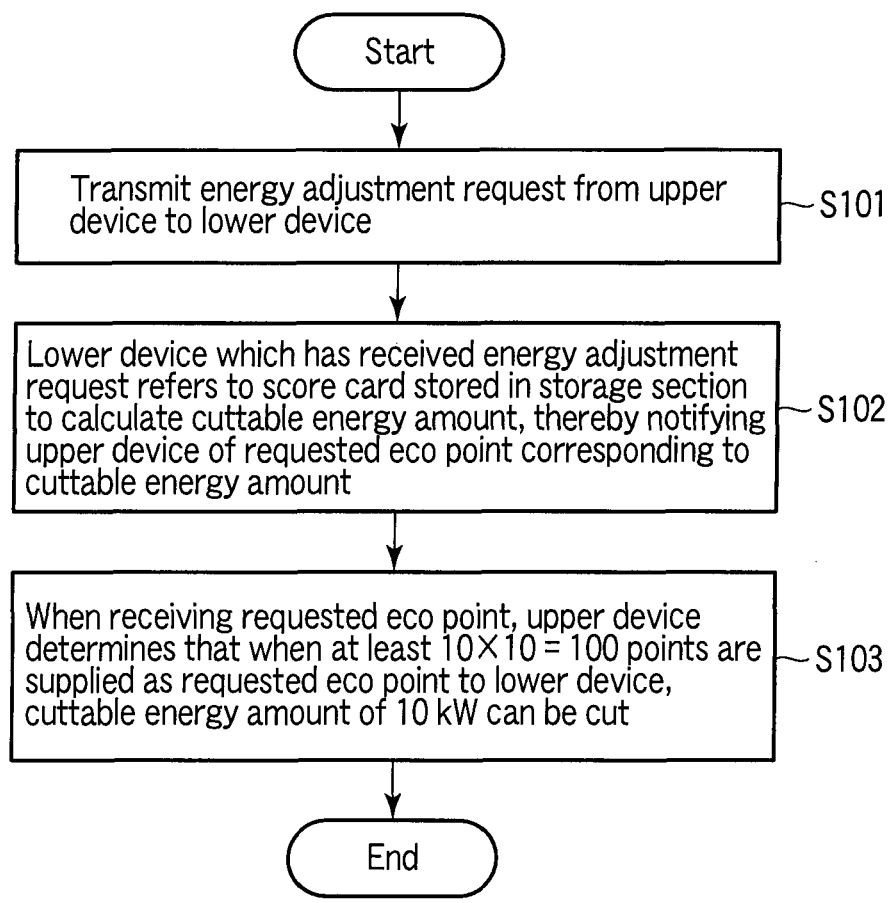
FIG. 17 is a flowchart showing an example of energy management processing by the energy management system according to the second embodiment.

FIG. 16 is a block diagram showing an example having a state where an eco point request amount with respect to an energy adjustment request is returned by the lower device 201 which has received the energy adjustment request from the upper device 11 according to the second embodiment. FIG. 17 is a flowchart showing a procedure of the energy management system according to the second embodiment.

The upper device 11 transmits, to the lower device 201, for example, 10 kW as the energy adjustment request indicating the amount of the energy which needs to be cut at a certain time (step S101). The lower device 201 which has received the energy adjustment request calculates a cuttable energy amount based on an energy demand of the energy demand device 200, and returns a requested eco point (e.g., 10 points/kW) corresponding to the cuttable energy amount to the upper device 11 (step S102). The upper device 11 which has received the requested eco point determines that when at least 10×10=100 points are supplied as the eco point to the lower device 201, 10 kW can be cut as the amount of the energy which needs to be cut (step S103).

Next, FIG. 18 is a block diagram showing an example in a state where the lower device 201 which has received a provideable eco point amount from the upper device 11 returns an adjustable energy amount corresponding to the provideable eco point amount in the second embodiment.

At a certain time, the upper device 11 transmits, to the lower device 201, the provideable eco point amount (e.g., 100 points) indicating the eco point which can be supplied from the upper device 11 to the lower device 201. In the lower device 201 which has received the provideable eco point amount, a ratio (e.g., 10 points/kW) of the requested eco point (the reward eco point) with respect to a cut energy amount is beforehand set based on the energy demand of the energy demand device 200. The lower device 201 calculates 100 points/10 (points/kW) based on the provideable eco point amount received from the upper device 11, and returns 10 kW as the cuttable energy amount to the upper device 11. The upper device 11 which has received the cuttable energy amount determines that when at least 100 points are supplied to the lower device 201, an energy amount of 10 kW can be cut.

The above data transmission/reception is processing necessary for executing the negotiation. Furthermore, when not only the negotiation in a predetermined time section but also a negotiation for a predetermined period of time are performed, the processing becomes complicated. It is considered that there are usually limits to the eco point which can be provided with respect to the energy cut amount from the upper device 11, and the amount of the energy which can be cut with respect to the eco point (the reward eco point) supplied to the lower device 201. A score card is applied so as to reflect a complicated requirement and condition in the negotiation.

FIG. 19 is a block diagram showing an example of the negotiation using the score card. The upper device 11 transmits a cut request score card to the lower device 201. The lower device 201 returns a cut suggestion score card to the upper device 11.

FIG. 20 is a table showing an example of the cut request score card.

Moreover, FIG. 21 is a table showing one example of the cut suggestion score card.

As to the cut request score card and the cut suggestion score card, respectively, relations among predicted power consumptions in a plurality of time sections of one o'clock, two o'clock and three o'clock on a certain day, the predicted error ratio of a predicted power consumption, the eco point and energy cut request amount at each time, and the cuttable energy amount are shown in function tables.

For example, the cut request score card of FIG. 20 indicates that 1 point is supplied as the reward eco point from the upper device 11 to the lower device 201 with respect to an energy cut of 10% at one o'clock.

For example, in the cut suggestion score card of FIG. 21, when the reward eco point is supplied from the upper device 11 to the lower device 201, an energy cut of 20% is suggested with respect to the reward eco point of 1 point.

Afterward, the negotiation function 210a of the lower device 201 and the negotiation function 20a of the upper device 11 cooperate with each other to execute the negotiation, and calculate an optimum energy cut amount (a compromise point). For example, the negotiation function 20a of the upper device 11 further notifies the negotiation function 210a of the increase of the cut amount in a case where the energy supply to the lower device 201 is to be cut as much as possible.

Figure 22:
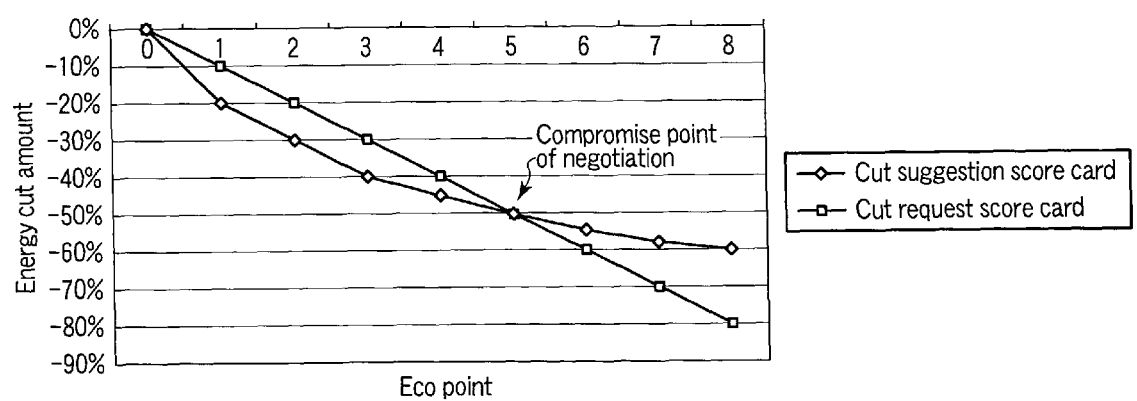
FIG. 22 is a graph showing an example of a compromise point in negotiation executed by the energy management system according to the second embodiment.

FIG. 22 is a graph showing an example of a relation between the reward eco point and the energy cut amount at one o'clock in the cut request score card and the cut suggestion score card.

The eco point value of the cut request score card matches that of the cut suggestion score card in a case where the eco point corresponding to a cut amount of 50% is 5 points. Thus, on a condition that the eco point corresponding to the cut amount of 50% is 5 points, the optimum energy cut amount is calculated between the negotiation function 20a of the upper device 11 and the negotiation function 210a of the lower device 201. Similarly, at two o'clock, an agreement is made between the negotiation function 20a of the upper device 11 and the negotiation function 210a of the lower device 201 on a condition that the eco point corresponding to a cut amount of 10% is 1 point. At three o'clock, an agreement is made between the upper device 11 and the lower device 201 on a condition that the eco point corresponding to a cut amount of 60% is 3 points.

In this way, a point where at each time, the complicated condition are satisfied and the eco point value which is to be supplied is matched (a agreement point or the compromise point) is easily and immediately calculated by the transmission/reception of the cut request score card and the cut suggestion score card.

It is to be noted that the negotiation of the hierarchical type energy management system according to the second embodiment will be described with respect to an example in which the energy is cut. However, the present embodiment also applies to a case where the energy is increased. Furthermore, the functions of the upper device 11 and the lower device 201 can be reversed. For example, the lower device 201 may transmit a necessary energy increase amount to the upper device 11, and the upper device 11 may request the lower device 201 to pay the eco point corresponding to the received energy increase amount.

Effect of Energy Management System According to Second Embodiment

When the second embodiment is used, an effect similar to that of the first embodiment can be obtained. For example, as shown in FIG. 20, the energy adjustment amount and the corresponding eco point request are transmitted and received by bidirectional communication to realize the negotiation between the negotiation function 20a of the upper device 11 and the negotiation function 210a of the lower device 201. Moreover, for example, as shown in FIG. 21, the provideable eco point and the corresponding energy adjustment amount are transmitted and received by the bidirectional communication to realize the negotiation between the negotiation function 20a of the upper device 11 and the negotiation function 210a of the lower device 201. This enables load control to satisfy the condition on the energy adjustment between the upper device 11 and the lower device 201.

In the second embodiment, relations among the energy adjustment request amount, the adjustable energy amount and the reward eco point are managed in the form of the score card. In consequence, a request condition over a plurality of time sections can be managed and transmitted, and a cuttable energy limit and a provideable eco point upper limit can mutually be notified, whereby the negotiation satisfying a complicated operation condition can be realized between the upper device 11 and the lower device 201.

Third Embodiment

Figure 23:
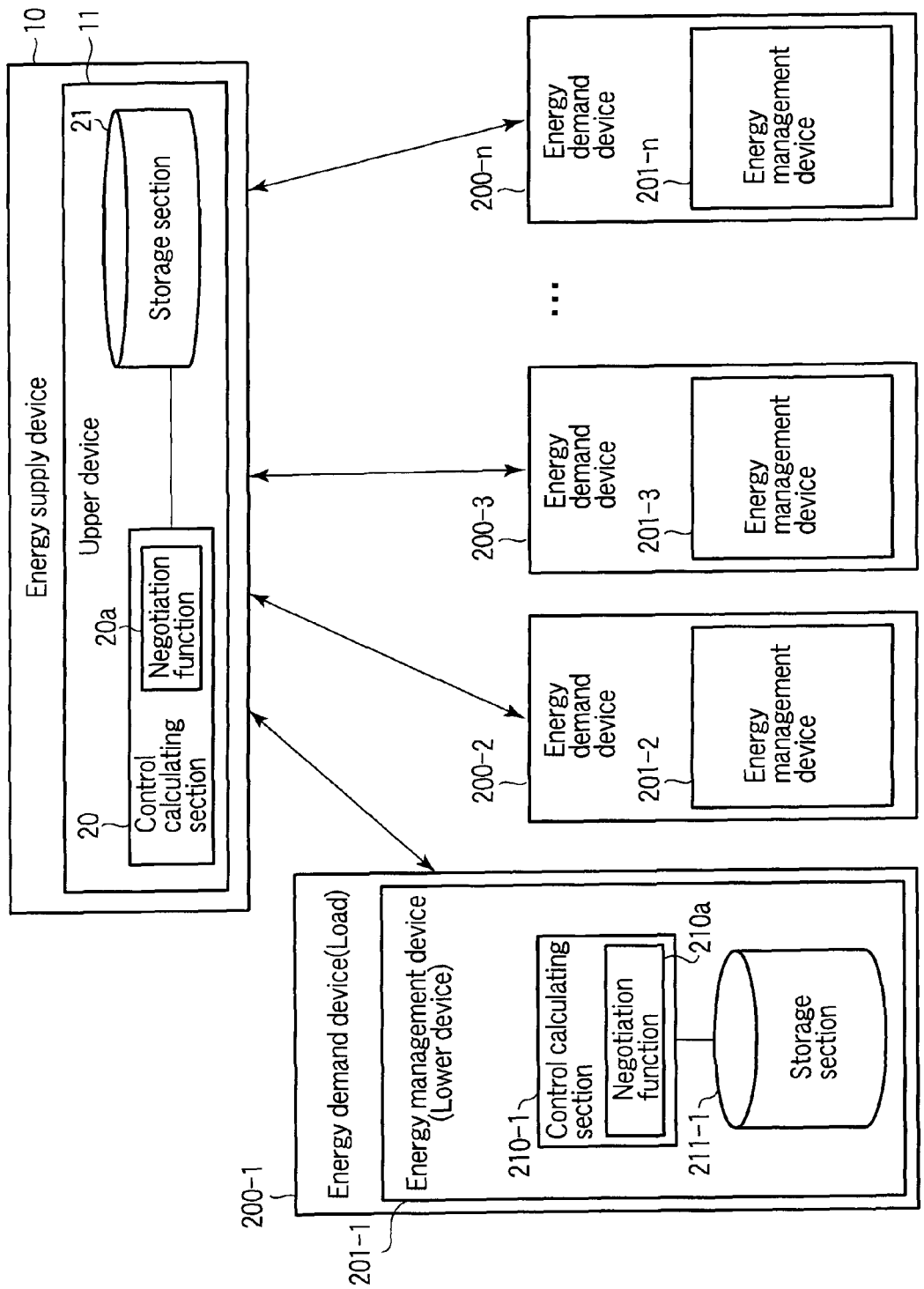
FIG. 23 is a block diagram showing an example of a structure of an energy management system according to a third embodiment.

FIG. 23 is a block diagram showing one example of a constitution of an energy management system according to a third embodiment. The energy management system according to the third embodiment is different from the above second embodiment in that bidirectional communication and negotiation are executed among an upper device 11 of an energy supply device 10 and lower devices 201-1 to 201-$n$ of a plurality of energy demand devices 200-1 to 200-$n$.

The energy management system of the third embodiment comprises the energy supply device 10 and the plurality of energy demand devices 200-1 to 200-$n$. The energy supply device 10 comprises the upper device 11. The upper device 11 comprises the control calculating section 20 including the negotiation function 20a and the storage section 21. The plurality of energy demand devices 200-1 to 200-$n$ comprise the lower devices 201-1 to 201-$n$, respectively. The lower devices 201-1 to 201-$n$ comprise control calculating sections 210-1 to 210-$n$ including the negotiation function 210a and storage sections 211-1 to 211-$n$, respectively. However, in FIG. 23, the control calculating sections 210-2 to 210-$n$ and the storage sections 211-2 to 211-$n$ are omitted.

FIG. 24 is a block diagram schematically showing a case where one upper device 11 and two lower devices 201-1 and 201-2 are included, so as to facilitate the understanding of the energy management system according to the third embodiment.

Operation/Function of Energy Management System According to Third Embodiment

The operation/function of the energy management system according to the third embodiment will be described.

In the example of FIG. 24, the upper device 11 transmits, for example, an energy cut amount of 10 kW as the energy adjustment request amount to the lower devices 201-1 and 201-2.

The lower device 201-1 can cut, for example, 6 kW at maximum at a rate of 1 kW/point. The lower device 201-2 can cut, for example, 10 kW at maximum at a rate of 0.5 kW/point.

In this case, the upper device 11 executes negotiation where optimum distribution is calculated so as to satisfy the energy adjustment request amount (an energy cut of 10 kW) and to minimize a reward eco point to be supplied to the lower devices 201-1 and 201-2. In this calculation of negotiating, a solution is usually obtained by mathematical programming such as linear programming. For example, 6 kW is assigned as the cut amount to the lower device 201-1, and 4 kW is assigned to the lower device 201-1 to achieve an energy cut of 10 kW in total. Moreover, when 6 points are distributed to the lower device 201-1 and 8 points are distributed to the lower device 201-2 to distribute 14 points in total as the eco point, the optimum distribution can be obtained.

This optimum value is obtained by solving the following numerical formulas as a linear programming problem.

Minimization: $P1+P2$

Restricting Conditions:

$$1 \text{ [kW/point]} \times P1 \text{ [point]} \leq 6 \text{ kW}$$

$$0.5 \text{ [kW/point]} \times P2 \text{ [point]} \leq 10 \text{ kW}$$

$$1 \text{ [kW/point]} \times P1 \text{ [point]} + 0.5 \text{ [kW/point]} \times P2 \text{ [point]} = 10 \text{ kW}$$

The above numerical formulas can be solved to obtain optimum solutions $P1=6$ points and $P2=8$ points.

In an example of FIG. 25, the upper device 11 transmits a provideable eco point amount of, for example, 14 points to the lower devices 201-1 and 201-2.

The lower device 201-1 can cut, for example, 6 kW at maximum at a rate of 1 kW/point. The lower device 201-2 can cut, for example, 10 kW at maximum at a rate of 0.5 kW/point.

In this case, the upper device 11 executes negotiation where an optimum distribution is calculated so as to satisfy a condition that a provided eco point is equal or less than an upper limit of the provideable eco point, and to maximize the amount of the energy to be cut. In this calculation of negotiating, as described above, a solution is obtained by mathematical programming such as linear programming. For example, when 6 points are distributed to the lower device 201-1 and 8 points are distributed to the lower device 201-2 to distribute 14 points in total as the eco point, and the lower device 201-1 cuts an energy of 6 kW and the lower device 201-2 cuts an energy of 4 kW to cut an energy of 10 kW in total, the optimum distribution is obtained.

This optimum value is obtained by solving the following numerical formulas as a linear programming problem.

Maximization: $1 \text{ [kW/point]} \times P1 \text{ [point]} + 0.5 \text{ [kW/point]} \times P2 \text{ [point]}$ Restricting Conditions:

$$1\,[\text{kW/point}] \times P1\,[\text{point}] \leq 6\text{ kW}$$

$$0.5\,[\text{kW/point}] \times P2\,[\text{point}] \leq 10\text{ kW}$$

$$P1\,[\text{point}] + P2\,[\text{point}] = 14\text{ points}$$

The above numerical formulas can be solved to obtain optimum solutions P1=6 points and P2=8 points. In consequence, the lower device 201-1 cuts an energy of 6 kW, and the lower device 201-2 cuts an energy of 4 kW, to cut an energy of 10 kW in total.

FIG. 26 is a block diagram schematically showing a state where a negotiation is realized by using a score card. Here, the lower device 201-1 can cut, for example, load energy. The lower device 201-2 can energy shift for the load.

In this case, the upper device 11 transmits cut a request score card to the lower devices 201-1 and 201-2, respectively. For example, in FIG. 27, the cut request score card includes a request for cutting energy of 5% by supplying 2 points as the reward eco point from the upper device 11.

For example, as shown in FIG. 28, the lower device 201-1 transmits, to the upper device 11, a cut suggestion score card indicating that 1 point is requested as the eco point with respect to a load cut of 5%.

For example, as shown in FIG. 29, the lower device 201-2 transmits, to the upper device 11, a shift suggestion score card indicating that when a load of 15% is shifted from one o'clock to two o'clock, 1 point is requested as the eco point.

The upper device 11 executes a negotiation where optimum energy cut distribution is calculated so as to realize the cut of the energy as much as possible with less eco points. As the result of this negotiation, as to 10 points as the reward eco point, 5 points are distributed to each of the lower devices 201-1 and 201-2. The lower device 201-1 cuts energy of 25%. The lower device 201-2 realizes energy shift of 25%.

This optimum value is obtained by solving following numerical formulas as a linear programming problem.

Maximization: f1(P1)+f2(P2), in which f1( ) is a function based on the score card of FIGS. 28, and f2( ) is a function based on the score card of FIG. 29. f1( ) and f2( ) are functions indicating a relation between the eco point and a rate [%] of the energy cut.

Restricting Conditions:

$$0 \leq P1 \leq 7$$

$$0 \leq P2 \leq 5$$

$$P1 + P2 = 10\,[\text{points}]$$

When the above numerical formulas are solved, optimum solutions P1=5 points and P2=5 points are obtained. In consequence, the lower device 201-1 cuts energy of 25%. The lower device 201-2 shifts energy of 25%.

Effect of Hierarchical Type Energy Management System According to Third Embodiment In the above third embodiment, an effect similar to that of the second embodiment can be obtained. Specifically, the negotiation is executed among one upper device 11 and a plurality of lower devices 201-1 to 201-$n$, and the energy cut amount can optimally be distributed in a range of provideable eco points. Moreover, the eco point distribution can optimally be performed on the condition of a necessary energy cut amount. Furthermore, by the negotiation using the score card, the optimum adjusting distribution can be performed, even when different configurations of energy load adjustment, for example, the cut of the energy consumption amount itself and the time shift of the energy consumption are mixed.

Fourth Embodiment

Figure 30:
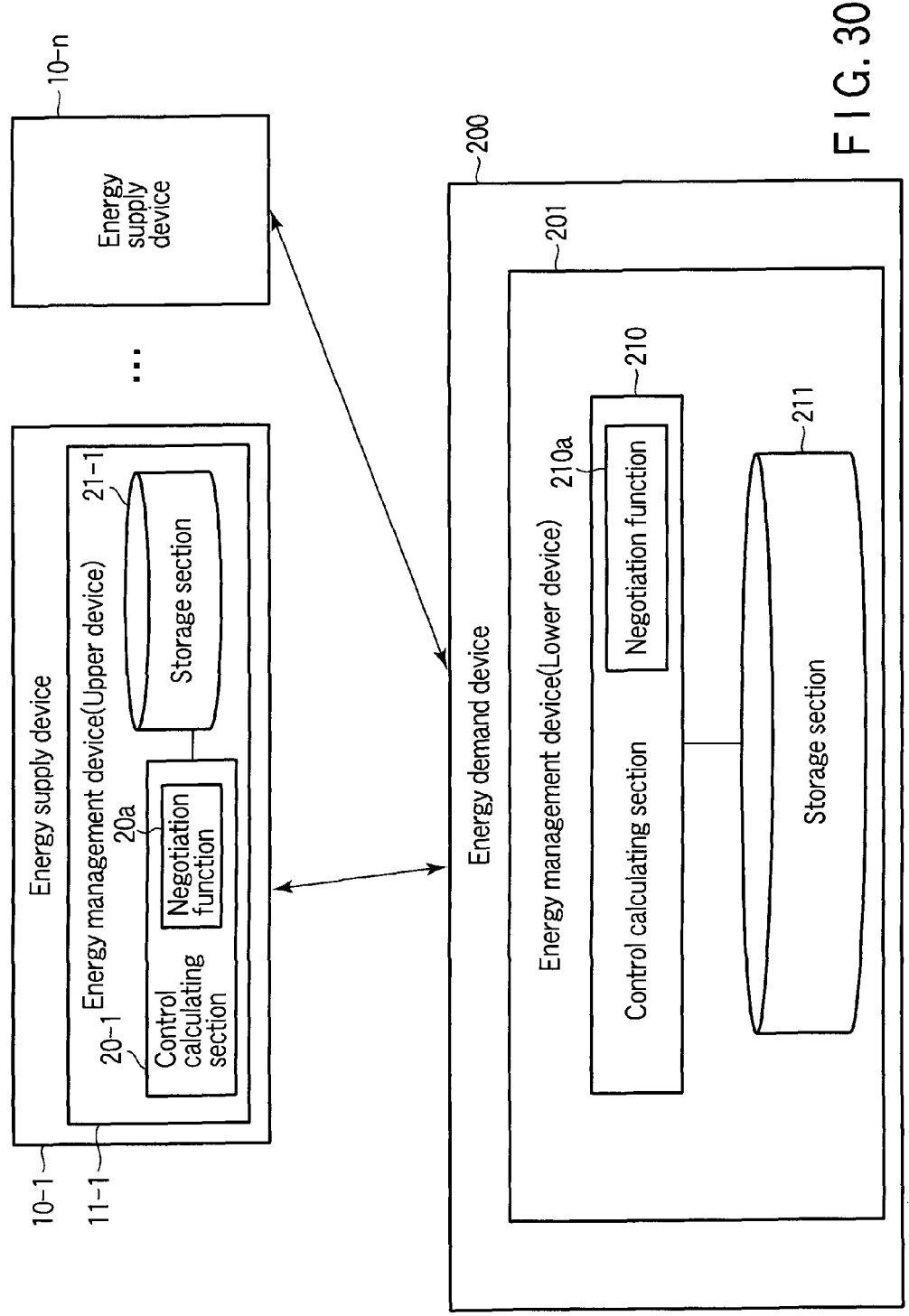
FIG. 30 is a block diagram showing an example of a structure of an energy management system according to a fourth embodiment.

FIG. 30 is a block diagram showing one example of a constitution of an energy management system according to the fourth embodiment. The energy management system according to the fourth embodiment is different from the above third embodiment in that bidirectional communication and negotiation are executed among upper devices 11-1 to 11-$n$ of a plurality of energy supply devices 10-1 to 10-$n$ and a lower device 201 of one energy demand device 200.

The energy management system of the fourth embodiment comprises the plurality of energy supply devices 10-1 to 10-$n$ and the energy demand device 200.

The energy supply devices 10-1 to 10-$n$ comprise the upper devices 11-1 to 11-$n$, respectively. The upper devices 11-1 to 11-$n$ comprise control calculating sections 20-1 to 20-$n$ including the negotiation function 20$a$ and storage sections 21-1 to 21-$n$, respectively. In FIG. 30, the upper device 11-$n$ of the energy supply device 10-$n$ is omitted.

The energy demand device 200 comprises the lower device 201. The lower device 201 comprises the control calculating section 210 including the negotiation function 210$a$ and the storage section 211.

FIG. 31 is a block diagram schematically showing a case where two upper devices 11-1 and 11-2 and one lower device 201 are included, so as to facilitate the understanding of the hierarchical type energy management system according to the fourth embodiment.

(Operation/Function of Hierarchical Type Energy Management System According to Fourth Embodiment)

The operation/function of the energy management system according to the fourth embodiment will be described.

In an example of FIG. 31, the upper device 11-1 transmits, to the lower device 201, an energy adjustment request amount requesting that energy of, for example, 6 points at maximum is cut at a rate of 1 kW/point.

The upper device 11-2 transmits, to the lower device 201, an energy adjustment request amount requesting that energy of, for example, 10 points at maximum is cut at a rate of 0.5 kW/point.

The lower device 201 determines that when energy of, for example, 10 kW can be cut, the lower device 201 executes a cut of energy of 5 kW with respect to the upper device 11-1, and executes a cut of energy of 5 kW with respect to the upper device 11-2, whereby the eco points supplied from the upper devices 11-1 and 11-2 are optimally maximized. In this way, the lower device 201 calculates an optimum distribution to maximize the eco point supplied from the upper devices 11-1 and 11-2 in a range of a cuttable energy amount.

This optimum value is obtained by solving following numerical formulas as a linear programming problem.

Maximization: P1+P2

Restricting Conditions:

$$P1 \leq 6$$

$$P2 \leq 10$$

$$1\,[\text{kW/point}] \times P1\,[\text{point}] + 0.5\,[\text{kW/point}] \times P2\,[\text{point}] \leq 10\text{ kW}$$

The above numerical formulas can be solved to obtain optimum solutions P1=5 points and P2=10 points. Therefore, it is optimum to set the energy cut amount with respect to the upper device 11-1 to 5 kW and to set the energy cut amount with respect to the upper device 11-2 to 5 kW.

In an example of FIG. 32, the upper device 11-1 transmits, to the lower device 201, a provideable eco point amount indicating that, for example, 6 points at maximum are supplied as the eco point at a rate of 1 kW/point.

The upper device 11-2 transmits, to the lower device 201, a provideable eco point amount indicating that, for example, 10 points at maximum are supplied as the eco point at a rate of 5 kW/point.

The lower device 201 determines that when, for example, 12 points are necessary as the eco point, it is optimum to assign a cut amount of 2 kW to the upper device 11-1 and to assign a cut amount of 5 kW to the upper device 11-2, because the energy cut amount is minimized on the condition of requested eco points. In this way, the lower device 201 calculates the optimum distribution so as to minimize the energy cut amount assigned to the upper devices 11-1 and 11-2 in a range of a necessary eco point amount of the lower device 201. This calculation of the optimum distribution is executed based on mathematical programming.

The optimum value is obtained by solving following numerical formulas as a linear programming problem.

Minimization: 1 [kW/point]×$P1$ [point]+0.5 [kW/point]×$P2$ [point]

Restricting conditions: $P1 \leq 6$ $P2 \leq 10$ $P1+P2=12$

When the above numerical formulas are solved, optimum solutions P1=2 points and P2=10 points are obtained. Therefore, as to the energy cut amount by the lower device 201, it is optimum to assign a cut amount of 2 kW to the upper device 11-1 and to assign a cut amount of 5 kW to the upper device 11-2.

FIG. 33 is a block diagram schematically showing a state where the above negotiation is executed by using a score card.

In FIG. 33, the energy cut amounts distributed from one lower device 201 to the upper devices 11-1 and 11-2 are optimized, respectively.

The upper devices 11-1 and 11-2 transmit cut request score cards to the lower device 201, respectively.

The lower device 201 receives the cut request score cards from the upper devices 11-1 and 11-2, respectively, and calculates a distribution of an optimum energy cut so as to acquire a large number of eco points with a less energy cut amount, wherever possible.

FIG. 34 is one example of a cut request score card transmitted from the upper device 11-1 to the lower device 201.

The score card of FIG. 34 indicates that, for example, a supply energy cut of 3 kWh is requested with respect to 1 eco point.

FIG. 35 is one example of a cut request score card transmitted from the upper device 11-2 to the lower device 201.

This score card of FIG. 35 indicates that, for example, a supply energy cut of 0.5 kWh is requested with respect to 1 eco point.

FIG. 36 is one example of a cut suggestion score card transmitted from the lower device 201 to the upper devices 11-1 and 11-2.

It is indicated that the lower device 201 can cut supply energy of 1 kWh with respect to, for example, 1 eco point.

The lower device 201 executes negotiation where optimum energy cut distribution is calculated so as to realize a large number of eco points with a less energy cut, wherever possible. As the result of this negotiation, as to 6 points as the reward eco point, 2 points are assigned to the upper device 11-1, and 4 points are assigned to the upper device 11-2. The lower device 201 cuts the amount of the power received from the upper device 11-1 as much as 6 kWh, and cuts the amount of the power received from the upper device 11-2 as much as 2 kWh, thereby realizing energy cut adjustment to cut 8 kWh in total.

This optimum value is obtained by solving the following numerical formulas as a linear programming problem.

Maximization: P1+P2

Restricting Conditions:

$0 \leq P1 \leq 3$ $0 \leq P2 \leq 4$ $f1(P1)+f2(P2) \leq f3(P1+P2)$, in which $f1( )$ is a function based on the score card of FIG. 34, $f2( )$ is a function based on the score card of FIGS. 35, and $f3( )$ is a function based on the score card of FIG. 36. $f1( )$, $f2( )$ and $f3( )$ are functions indicating a relation between the eco point and a rate [%] of the energy cut.

When the above numerical formulas are solved, optimum solutions P1=2 points and P2=4 points are obtained. In consequence, the upper device 11-1 performs energy cut of 6 kWh with respect to the lower device 201, and performs energy cut of 2 kWh with respect to the lower device 201. The lower device 201 achieves energy cut of 8 kWh in total.

Effect of Hierarchical Type Energy Management System According to Fourth Embodiment In the above fourth embodiment, an effect similar to that of the third embodiment can be obtained. The negotiation is executed among one lower device 201 and a plurality of upper devices 11, and the lower device 201 can obtain the distribution of minimum energy cut amount in total in a range of necessary eco points. Moreover, the lower device 201 can obtain the distribution of the maximum eco point request in total based on the condition of the cuttable energy amount. Furthermore, by the negotiation using the score card, the energy cut amount and the eco points can optimally be distributed, even when different configurations of the energy supply adjustment, for example, the cut of the energy supply amount itself and the time shift of the energy shift are mixed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An energy management system including an energy supply device and an energy demand device to which energy is supplied from the energy supply device, the energy management system comprising:
a first energy management device applied for the energy supply device;
a second energy management device applied for the energy demand device;

storage sections which are included in the first energy management device and the second energy management device, respectively, and in which a condition as to comply with an adjustment request of the energy supplied from the energy supply device to the energy demand device is stored; and calculating sections which are included in the first energy management device and the second energy management device, respectively, and which cooperate to execute a negotiation function calculating an energy adjustment amount satisfying the condition, wherein the negotiation function performs a bidirectional communication where one device of the first or second energy management devices provides a request condition concerning energy adjusting for another device of the first or second energy management devices and said another device provides a reward condition with respect to the request condition for said one device, and wherein the energy adjustment amount includes minimum and maximum energy adjustment amounts relating to the request condition and minimum and maximum values relating to the reward condition.

2. The energy management system according to claim 1, further comprising at least one of the energy supply devices and the energy demand devices.

3. The energy management system according to claim 1, wherein an intermediate layer is between an upper layer to which the energy supply device belongs and a lower layer to which the energy demand device belongs, and a third energy management device belonging to the intermediate layer executes a communication for the negotiation function between the first energy management device of the upper layer and the second energy management device of the lower layer.

4. The energy management system according to claim 3, further comprising the energy supply devices belong an uppermost layer of a hierarchical structure including the upper layer, the lower layer and the intermediate layer.

5. The energy management system according to claim 3, further comprising the energy demand devices belong a lowermost layer of a hierarchical structure including the upper layer, the lower layer and the intermediate layer.

6. The energy management system according to claim 3, wherein a first layer is included in a hierarchical structure including the upper layer, the lower layer and the intermediate layer, the first energy management device belonging to the first layer receives a plurality of pieces of information from the second energy management devices belonging to the second layer being lower than the first layer, and processes the received plurality of pieces of information to update information stored in the storage section of the first energy management device belonging to the first layer based on a processed result.

7. The energy management system according to claim 3, wherein the condition is data including an energy adjustment request amount requested by the energy supply device, and an adjustable energy amount indicating an energy amount adjustable by the energy demand device, the data includes an index value indicates a reward corresponding to the energy adjustment amount in a case where an energy adjustment is executed by the energy demand device, and the third energy management device receives the energy adjustment request amount from the first energy management device, determines a distribution of the energy adjustment request amount for the second energy management devices so that a total of energy adjustment amounts when the energy adjustments are executed by the second energy management devices is equal or more than the energy adjustment request amount, and a total of the index values with respect to the energy adjustments executed by the second energy management devices based on the energy adjustment request amount is minimum, and transmits, to the first energy management device, the total of the index values corresponding to the distribution.

8. The energy management system according to claim 3, wherein the condition is data including an energy adjustment request amount requested by the energy supply device, and an adjustable energy amount indicating an energy amount adjustable by the energy demand device, the data includes an index value indicates a reward corresponding to the energy adjustment amount in a case where an energy adjustment is executed by the energy demand device, and the third energy management device receives a provideable amount of the index value from the first energy management, determines a distribution of the index value for the second energy management devices so that the index value corresponding to a total of energy adjustment amounts when the energy adjustments are executed by the second energy management devices is equal or less than the provideable amount, and the total of energy adjustment amounts is maximum, and transmits, to the first energy management device, an adjustable energy amount corresponding to the distribution of the index value.

9. The energy management system according to claim 1, wherein the condition is data including an energy adjustment request amount requested by the energy supply device, and an adjustable energy amount indicating an energy amount adjustable by the energy demand device at each time using to numeric values.

10. The energy management system according to claim 9, wherein the data includes an index value which indicates a reward at each time corresponding to the energy adjustment amount by a numeric value in a case where an energy adjustment is executed by the energy demand device.

11. The energy management system according to claim 10, wherein the first energy management device obtains the index value indicating the reward corresponding to the energy adjustment amount, when the energy adjustment is executed by the energy demand device.

12. The energy management system according to claim 9, wherein the data includes, as an attribute value concerning the adjustable energy amount, at least one of:

information of an adjustable amount of an energy consumption of a load in the second energy management device;

information of a shiftable amount of a time when the energy consumption of the load occurs;

information of an adjustable amount of an operation time of the load or an adjustable amount of an accumulated energy of the load;

information indicating a propriety of blocking of the energy consumption of the load; and information of the energy consumption of the load or an amount of energy to be generated, and an error or an error ratio thereof.

13. The energy management system according to claim 12, wherein the data includes a predicted value with respect to a time axis as an attribute value.

14. The energy management system according to claim 9, wherein the second energy management device receives information including the energy adjustment request amount from the first energy management device to calculate the energy adjustment amount.

15. An energy management method used in an energy management system including an energy supply device and an energy demand device to which energy is supplied from the energy supply device, wherein the energy supply device comprises a first energy management device, the energy demand device comprises a second energy management device, and the energy management method comprises storing a condition which complies with an adjustment request of the energy supplied from the energy supply device to the energy demand device in storage sections, the storage sections being included in the first energy management device and the second energy management device, respectively; and cooperating to execute negotiation processing calculating an energy adjustment amount satisfying the condition by calculating sections, the calculating sections being included in the first energy management device and the second energy management device, respectively, the negotiation processing performs a bidirectional communication where one device of the first or second energy management devices provides a request condition concerning energy adjusting for another device of the first or second energy management devices and said another device provides a reward condition with respect to the request condition for said one device, and the energy adjustment amount includes minimum and maximum energy adjustment amounts relating to the request condition and minimum and maximum values relating to the reward condition.

\* \* \* \* \*

UNITED STATES PATENT AND TRADEMARK OFFICE
CERTIFICATE OF CORRECTION

PATENT NO. : 8,612,062 B2  
APPLICATION NO. : 12/876478  
DATED : December 17, 2013  
INVENTOR(S) : Iino et al.

It is certified that error appears in the above-identified patent and that said Letters Patent is hereby corrected as shown below:

In the Claims

Claim 4, column 25, lines 37-38, change "belong an" to --belonging to an--.

Claim 5, column 25, line 41, change "belong a" to --belonging to a--.

Claim 8, column 26, line 21, change "indicates" to --indicating--.

Claim 8, column 26, line 27, change "management" to --management device--.

Signed and Sealed this  
Sixth Day of May, 2014

Michelle K. Lee  
*Deputy Director of the United States Patent and Trademark Office*